(12) United States Patent
Watanabe et al.

(10) Patent No.: US 8,795,910 B2
(45) Date of Patent: *Aug. 5, 2014

(54) SOLID OXIDE FUEL CELL DEVICE

(75) Inventors: Naoki Watanabe, Kitakyushu (JP);
Yousuke Akagi, Kitakyushu (JP);
Shuichiro Saigan, Kitakyushu (JP);
Nobuo Isaka, Kitakyushu (JP)

(73) Assignee: Toto Ltd., Fukuoka (JP)

( * ) Notice: Subject to any disclaimer, the term of this patent is extended or adjusted under 35 U.S.C. 154(b) by 351 days.

This patent is subject to a terminal disclaimer.

(21) Appl. No.: 13/260,997

(22) PCT Filed: Mar. 31, 2010

(86) PCT No.: PCT/JP2010/055908
§ 371 (c)(1),
(2), (4) Date: Sep. 29, 2011

(87) PCT Pub. No.: WO2010/114041
PCT Pub. Date: Oct. 7, 2010

(65) Prior Publication Data
US 2012/0021307 A1    Jan. 26, 2012

(30) Foreign Application Priority Data
Mar. 31, 2009  (JP) ................ 2009-087415

(51) Int. Cl.
*H01M 8/06* (2006.01)
*H01M 8/04* (2006.01)
*C01B 3/38* (2006.01)
*H01M 8/12* (2006.01)
*H01M 8/24* (2006.01)

(52) U.S. Cl.
CPC .......... *H01M 8/04365* (2013.01); *Y02E 60/525* (2013.01); *H01M 8/04835* (2013.01); *H01M 8/04014* (2013.01); *C01B 3/382* (2013.01); *Y02E 60/50* (2013.01); *C01B 2203/0233* (2013.01); *C01B 2203/1064* (2013.01); *C01B 2203/1685* (2013.01); *H01M 2008/1293* (2013.01); *C01B 2203/1609* (2013.01); *H01M 8/243* (2013.01); *C01B 2203/066* (2013.01); *C01B 2203/1058* (2013.01); *H01M 8/04955* (2013.01); *C01B 3/384* (2013.01); *H01M 8/04373* (2013.01); *C01B 2203/1604* (2013.01); *H01M 8/0618* (2013.01); *C01B 2203/0261* (2013.01); *H01M 8/04223* (2013.01); *H01M 8/04089* (2013.01); *C01B 2203/1619* (2013.01); *H01M 8/04753* (2013.01); *C01B 2203/1258* (2013.01); *C01B 2203/0244* (2013.01)
USPC .......................................... 429/413; 429/423

(58) Field of Classification Search
USPC .................. 429/412, 423, 429, 442, 433, 413
See application file for complete search history.

(56) References Cited

U.S. PATENT DOCUMENTS

| 2008/0268305 | A1* | 10/2008 | Son ................................ 429/19 |
| 2009/0291335 | A1 | 11/2009 | Anzai |
| 2011/0053017 | A1 | 3/2011 | Takahashi |
| 2014/0011106 | A1 | 1/2014 | Takahashi |

FOREIGN PATENT DOCUMENTS

| CN | 101099256 A | 1/2008 | |
| JP | 2003-095611 A | 4/2003 | |
| JP | 2004-319420 | * 11/2004 | .............. H01M 8/00 |
| JP | 2004-319420 A | 11/2004 | |
| JP | 2004-338975 A | 12/2004 | |
| JP | 2006-086016 A | 3/2006 | |
| JP | 2006-190605 A | 7/2006 | |
| JP | 2006-269196 A | 10/2006 | |
| JP | 2007-311072 A | 11/2007 | |
| JP | 2008-243597 A | 10/2008 | |
| WO | WO 2007/137068 A1 | 11/2007 | |
| WO | WO 2009/028427 A1 | 3/2009 | |

OTHER PUBLICATIONS

Written Opinion of the International Searching Authority for International Application No. PCT/JP2010/055908, dated Jul. 20, 2010, 6 pages.
International Preliminary Report on Patentability for International Application No. PCT/JP2010/055908, dated Nov. 15, 2011, 7 pages.

International Search Report for International Application No. PCT/JP2010/055908, dated Jul. 20, 2010, 2 pages.
Extended European Search Report for European Application No. 10758812.1, dated Mar. 13, 2014, 9 pages.

* cited by examiner

*Primary Examiner* — Mark F Huff
*Assistant Examiner* — Monique Wills
(74) *Attorney, Agent, or Firm* — Brinks Gilson & Lione

(57) ABSTRACT

The present invention comprises individual fuel cells 84 disposed within a fuel cell module 2; a reformer 20; a reformer temperature sensor 148 and generating chamber temperature sensor 142 for detecting the reforming state temperature inside the reformer, and a control section 110 for controlling the fuel cell module operation. In a state whereby a stopping of fuel cell module operation has been executed from a high temperature, this control section skips the normal startup ATR and executes a restart control by the SR when the reforming state temperature is within the normal startup ATR temperature band and a restart of operation has been executed.

11 Claims, 17 Drawing Sheets

FIG.9(A)

| MODE | STATE | FUEL FLOW (L/min) | REFORMING AIR FLOW (L/min) | GENERATING AIR FLOW (L/min) | WATER FLOW (cc/min) | TRANSITION TEMPERATURE CONDITION (°C) REFORMER TEMP. Tr | STACK TEMP. Ts |
|---|---|---|---|---|---|---|---|
| | ON IGNITION | 6.0 | 10.0 | 100.0 | 0.0 | — | — |
| | COMBUSTION OPERATION | 6.0 | 10.0 | 100.0 | 0.0 | ≧300°C | — |
| NORMAL STARTUP MODE 1 | NORMAL STARTUP POX | 5.0 | 18.0 | 100.0 | 0.0 | ≧600°C | ≧250°C |
| | NORMAL STARTUP ATR | 4.0 | 4.0 | 100.0 | 3.0 | ≧650°C | ≧600°C |
| | NORMAL STARTUP SR | 3.0 | 0.0 | 100.0 | 8.0 | ≧650°C | ≧700°C |
| | ON IGNITION | 6.0 | 10.0 | 100.0 | 0.0 | IGNITE IF ≧200°C. TRANSITION TO RESTART POX IMMEDIATELY AFTER IGNITION | — |
| RESTART MODE 1 | NORMAL STARTUP ATR | 4.0 | 4.0 | 100.0 | 3.0 | ≧600°C | ≧500°C |
| | RESTART SR | 3.5 | 0.0 | 100.0 | 6.0 | ≧650°C | ≧600°C |
| | NORMAL STARTUP SR | 3.0 | 0.0 | 100.0 | 8.0 | ≧650°C | ≧700°C |

FIG.9(B)

| MODE | STATE | FUEL FLOW (L/min) | REFORMING AIR FLOW (L/min) | GENERATING AIR FLOW (L/min) | WATER FLOW (cc/min) | TRANSITION TEMPERATURE CONDITION (°C) | |
|---|---|---|---|---|---|---|---|
| | | | | | | REFORMER TEMP. Tr | STACK TEMP. Ts |
| NORMAL STARTUP MODE 2 | ON IGNITION | 6.0 | 10.0 | 100.0 | 0.0 | — | — |
| | COMBUSTION OPERATION | 6.0 | 10.0 | 100.0 | 0.0 | ≧300°C | — |
| | NORMAL STARTUP POX | 6.0 | 18.0 | 100.0 | 0.0 | ≧600°C | ≧250°C |
| | NORMAL STARTUP ATR 1 | 6.0 | 8.0 | 100.0 | 2.0 | ≧600°C | ≧400°C |
| | NORMAL STARTUP ATR 2 | 4.0 | 4.0 | 100.0 | 3.0 | ≧650°C | ≧600°C |
| | NORMAL STARTUP SR | 3.0 | 0.0 | 100.0 | 8.0 | ≧650°C | ≧700°C |
| RESTART MODE 2 | ON IGNITION | 6.0 | 10.0 | 100.0 | 0.0 | IGNITE IF ≧200°C. TRANSITION TO RESTART ATR IMMEDIATELY AFTER IGNITION | — |
| | NORMAL STARTUP ATR 1 | 6.0 | 8.0 | 100.0 | 2.0 | ≧400°C | ≧400°C |
| | NORMAL STARTUP ATR 2 | 4.0 | 4.0 | 100.0 | 3.0 | ≧600°C | ≧500°C |
| | RESTART SR | 3.5 | 0.0 | 100.0 | 6.0 | ≧600°C | ≧600°C (TRANSITION TO NORMAL STARTUP SR IF THERE IS A 50°C RISE AFTER TRANSITION TO RESTART SR, EVEN IF ≧600°C) |
| | NORMAL STARTUP SR | 3.0 | 0.0 | 100.0 | 8.0 | ≧650°C | ≧700°C |

US 8,795,910 B2

SOLID OXIDE FUEL CELL DEVICE

TECHNICAL FIELD

The present invention relates to a solid oxide fuel cell device, and more particularly to a solid oxide fuel cell device for generating electricity by reacting fuel gas with oxidant gas.

BACKGROUND ART

Solid oxide fuel cell ("SOFC" below) operate at relatively high temperatures, using an oxide ion conducting solid electrolyte as an electrolyte, with electrodes placed on both sides thereof, and with fuel gas supplied to one side thereof and oxidizer (air, oxygen, or the like) supplied to the other side thereof.

In such SOFC, steam or $CO_2$ is produced by the reaction between oxygen ions passed through the oxide ion conducting solid electrolyte and fuel, thereby generating electrical and thermal energy. The electrical energy is extracted from the SOFC, where it is used for various electrical purposes. At the same time, thermal energy is transferred to the fuel, SOFC, oxidant, etc., and used to raise the temperature thereof.

In conventional SOFC, when a microprocessor-based meter in a fuel gas supply system detects an anomaly during operation, or when anomalies due to earthquakes or the like arise, or when maintenance of auxiliary devices and the like are executed, it is necessary to temporarily halt operation. After such anomalies or other temporary factors have been resolved, or after him and maintenance is completed, prompt resumption of operation in as little time as possible is sought to ensure stable electrical generation.

In order to bring about prompt resumption of operation in fuel cell systems it has been proposed, for example in Patent Citation 1, that for conventional SOFC that when a restart of the fuel cell system is requested during a predetermined control process, the control system, rather than executing the first startup processing routine after executing all of the fuel cell system stop processing routines, should first transition to the point in time at which conditions are the same as for the point in time at which the call for restart was made, and then execute the restart process.

On the other hand, in the conventional SOFC set forth in Patent Document 2, it is proposed that thermal efficiency can be raised by housing the fuel cell stack in a housing container, while heating can be accomplished by heating with higher than conventional temperature fuel gases through combustion of excess gas in the housing container, thereby obtaining thermal quantities required for steam reforming when in a low load operation. To speed up operation in the conventional SOFC, a heating operation to heat the fuel reformer is performed when the fuel reformer temperature is less than the partial oxidation reaction starting temperature upon startup; when the temperature of the fuel reformer rises to a temperature band equal to or greater than the partial oxidation reaction starting temperature and less than the temperature at which steam reforming can occur, the fuel reformer is heated by reaction heat from partial oxidation and combustion heat from the fuel gas, thereby performing a partial oxidation reforming reaction ("PDX" below). Furthermore, when the temperature of the fuel cell rises to a temperature band at which steam reforming can occur, below the steady state temperature, reaction heat of the partial oxidation reaction, combustion heat from the fuel gas, and heat absorption by the steam reforming reaction are controlled to heat the fuel reformer, and an auto-thermal reforming reaction ("ATR" below) is performed in which partial oxidation reforming and steam reforming are used together, such that when the temperature of the fuel reformer reaches a steady state, the fuel reformer is heated by combustion heat from the fuel gas, and a steam reforming reaction ("SR" below) is performed. In other words, in the conventional SOFC of this type, startup was executed by reforming fuel in the sequence of PDX, ATR, and SR as the temperature of fuel reformer rose at start up, thereby enabling stable and prompt start up.

PRIOR ART DOCUMENTS

Patent Documents

Patent Document 1: JP-A-2006-269196
Patent Document 2: JP-A-2004-319420

SUMMARY OF THE INVENTION

However, in the SOFC set forth in the above-described Patent Documents 1 and 2, residual heat residing in the fuel cells and stack when not operating has the effect that portions of the fuel cells and stack are frequently in a high temperature state during startup.

In this regard, the inventors of the present invention have discovered an important and new problem, which is that when the fuel cells or the stack are in such a high temperature state, particularly when restarting by PDX, a heavy burden is placed on the cells.

More specifically, they discovered the serious problem that even though from a control standpoint the reforming temperature may appear suitable for PDX operation, when a restart occurs during stop operation control, a portion of the fuel cells or stack may be in a high-temperature state, so that when the PDX reaction is executed on the assumption that the temperature of the fuel reformer is within a temperature band above the partial oxidation starting temperature and below the temperature at which steam reforming can occur, due to the fact that in PDX there is an exothermal reaction accompanying partial oxidation upon the introduction of air, there may be an oxidizing effect imparted on the cells, or an extraordinarily high temperature state, leading to gradual degradation of the durability of the cells themselves or the electrical generating capability thereof. The present invention was undertaken to resolve this problem and to greatly reduce the time required for restart.

On the other hand, in the above-described Patent Documents 1 and 2, there is no disclosure or suggestion whatsoever of the concept whereby ATR is skipped and SR is executed when in a temperature band in which ATR operation is executed if during a normal startup as a way of further speeding up startup.

It is therefore an object of present invention to provide a solid oxide fuel cell device (SOFC) which, at the time of stopping, when there is a decline in temperature from a high temperature, skips the ATR of a normal startup but executes in its place an restart by SR to enable a stable reformer temperature $Tr(t)$ recovery and a shortened startup time.

The above object is achieved according to the present invention by providing a solid oxide fuel cell device for generating electricity by causing an electro-chemical reaction of a fuel gas and an oxidant gas, comprising: solid oxide fuel cells disposed within a solid oxide fuel cell module; a reformer for reforming fuel gas and supplying the fuel gas to the fuel cells, by executing any one of the reforming reaction PDX, wherein fuel gas is partial oxidation-reformed by causing a chemical reaction between a fuel gas and an oxidizing gas in a predetermined temperature band, the reforming reaction SR, wherein fuel gas is steam reformed by chemically reacting a fuel gas and steam, and the reforming reaction ATR, wherein fuel gas is auto-thermally reformed by the combined use of PDX and SR; a reforming state temperature detector for detecting the reforming state temperature in order to change the reforming state induced by the reformer; and a controller for controlling the operation of the fuel cell module, wherein the controller has a startup control device for controlling the startup of the operation of the fuel cell module, and a stop control device for controlling the stopping of the operation of the fuel cell module; wherein the startup control device executes a combustion operation to rise the temperature of reformer by the combustion heat of the fuel gas when, after the fuel gas is ignited and caused to combust, the reforming state temperature detected by the reforming state temperature detector is lower than the PDX starting temperature at which the PDX starts; the startup control device executes a normal startup PDX to raise the temperature of the reformer when the reforming state temperature is equal to or greater than the PDX starting temperature and within a PDX temperature band below the temperature at which steam reforming is possible; the startup control device executes a normal startup ATR to raise the temperature of the reformer when the reforming state temperature is equal to or greater than the temperature at which steam reforming is possible, and is within the ATR temperature band below a predetermined steady state temperature; the startup control device executes a normal startup SR to raise the temperature of the reformer when the reforming state temperature is equal to or greater than the predetermined steady state temperature; wherein, when stop processing by the stop control device is executed in association with stopping of the fuel cell module from a high temperature state, and a restart of operation has been executed within the ATR temperature band, the startup control device executes a restart control by the SR, skipping the normal startup ATR, at least when the reforming state temperature is in a high temperature region within the ATR temperature band.

According to the present invention thus constituted, a normal startup SR is skipped and a restart by SR taking active advantage of residual heat remaining in individual fuel cells or the reformer is executed when a restart of operation is implemented within the ATR temperature band in a state whereby operation of the fuel cell module is stopped by a stop control device. As a result, it is possible to prevent the effects of oxidation on individual fuel cells which arise because the non-implementation of the ATR during normal startup results in a large residual heat, even though apparent temperature is low, and to thereby improve durability. Also, by taking measures so as to execute restart control to take active advantage of the residual heat remaining in the fuel cells and reformer, startup time can be greatly reduced. Also, by taking measures so as to execute restart control to take active advantage of the residual heat remaining in the fuel cells and reformer, startup time can be greatly reduced. Moreover, when performing a restart based on a loss of flame at startup, the possibility that residual heat in individual fuel cells, the reformer, etc., can be utilized is low even if the reforming state temperature is within the normal startup ATR temperature band, therefore damage to the individual fuel cells can be restrained by prohibiting startup controls other than ATR upon normal startup.

In the preferred embodiment of the present invention, the startup control device executes the restart control by the ATR when the reforming state temperature is less than a predetermined temperature within the normal startup ATR temperature band, and executes the restart control by the SR when equal to or greater than the predetermined temperature within the ATR temperature band.

According to the present invention thus constituted, because the temperature is relatively low below the predetermined temperature in the ATR temperature band, execution of the ATR can reliably prevent sudden temperature drops induced by a supply of large amount of water and an execution of an SR consisting only of endothermic reactions under conditions of low outside air, etc., therefore a stable temperature recovery can be achieved in an optimal state.

In the preferred embodiment of the present invention, at least within the high temperature region of the ATR temperature band, the startup control device executes the restart control by the SR, instead of the normal startup ATR and the SR, which differs from the normal startup SR.

According to the present invention thus constituted, the drop in temperature in the reformer, etc. associated with supplying large amounts of water can be restrained, and temperature recovery can be much more appropriately accomplished by executing an SR different from the SR at normal startup, which makes active use of residual heat remaining in fuel cell modules such as individual fuel cells or the reformer upon restart.

In the preferred embodiment of the present invention, the SR executed in the restart control increases the amount of fuel gas supplied compared to SR during the normal startup.

According to the present invention thus constituted, by executing restart control based on the SR, in which there is more fuel gas supplied than in normal startup SR, temperature drops in the reformer, etc. can be restrained and rapid temperature recovery achieved by the execution of the SR retaining a high combustion temperature, even though the SR is an endothermic reaction only in the relatively low temperature band.

In the preferred embodiment of the present invention, the SR executed in restart control decreases the amount of water supplied compared to SR during the normal startup.

According to the present invention thus constituted, by executing restart control by the SR with less water supplied than the SR during the normal startup, sudden temperature drops in the reformer, and sudden spiraling into a negative state in which further temperature drops are precipitated by sudden exothermic reactions, can be prevented, and a quick and stable temperature rise can be achieved.

In the preferred embodiment of the present invention, the SR executed in the restart control changes to the normal startup SR when the reforming state temperature rises to or above a predetermined temperature.

According to the present invention thus constituted, in the SR executed in the restart control changes to normal startup SR when the temperature rises to the desired reforming state temperature and an active SR is executed, therefore a stable temperature rise can be achieved while restraining sudden drops of reformer temperature.

In the preferred embodiment of the present invention, the startup control device executes the restart control by SR, maintaining a predetermined fixed amount of fuel gas supply and water supply without variation.

According to the present invention thus constituted, because the restart by the SR is executed which maintains a predetermined fixed amount of fuel gas supply and water supply without variation, temperature recovery in the reformer and the like can be quickly and stably accomplished due to the prevention of factors which cause the state of the reformer to change, even in a temperature band which is low and unstable for SR operation.

In the preferred embodiment of the present invention, the solid oxide fuel cell device further comprises a water supply device for producing pure water and supplying the pure water to the reformer, wherein the water supply device has a water pipe for introducing water to the reformer and a warming device for keeping the water pipe warm.

According to the present invention thus constituted, because the temperature of the water supplied to the reformer from the water pipe of the water supply device during restart can be maintained at a high temperature by warming the water pipe using the warming device of the water supply device, temperature drops in the reformer or cells associated with the supply of water during restart SR can be restrained.

In the preferred embodiment of the present invention, the solid oxide fuel cell device further comprises a cell assembly support device for supporting the lower portion of a cell assembly having a plurality of individual fuel cells, and for forming an exhaust gas chamber into which exhaust gas produced by the combustion of fuel gas and oxidant gas is discharged, and the warming device restrains temperature drops in the water supplied to the reformer by disposing the water pipe so that the water pipe passes through the exhaust gas chamber.

According to the present invention thus constituted, by utilizing the heat of the exhaust gas in the exhaust gas chamber of the cell assembly support device, the temperature of the water supplied to the reformer from the water pipe of the water supply device at restart can be maintained at a high temperature, therefore drops in the temperature of the reformer or cells associated with the supply of water during restart SR can be restrained, and the restart by the SR can be reliably executed even in a relatively low temperature band.

In the preferred embodiment of the present invention, the solid oxide fuel cell device further comprises a housing member for containing the cell assembly, and an exhaust gas conduit for communicating with the exhaust gas chamber is disposed on the pair of opposing sides forming the housing member, and the water pipe conduit is disposed on the other side thereof.

According to the present invention thus constituted, because the water pipe is separated from the exhaust gas conduit relative to the housing, heat exchange from the housing can only be done with water on the other side surface, therefore a high temperature can be maintained in the water supplied to the reformer from the water pipe of the water supply device upon restart. Temperature drops in the reformer associated with the supply of water during restart SR can be restrained.

The present invention is a solid oxide fuel cell device for generating electricity by causing an electro-chemical reaction of a fuel gas and an oxidant gas, comprising: solid oxide fuel cells disposed within a solid oxide fuel cell module; means for reforming fuel gas and supplying the fuel gas to the fuel cells, by executing any one of the reforming reaction PDX, wherein fuel gas is partial oxidation-reformed by causing a chemical reaction between a fuel gas and an oxidizing gas in a predetermined temperature band, the reforming reaction SR, wherein fuel gas is steam reformed by chemically reacting a fuel gas and steam, and the reforming reaction ATR, wherein fuel gas is auto-thermally reformed by the combined use of PDX and SR; means for detecting the reforming state temperature in order to change the reforming state induced by the reformer; and means for controlling the operation of the fuel cell module, wherein the controlling means has means for controlling the startup of the operation of the fuel cell module, and means for controlling the stopping of the operation of the fuel cell module; wherein the startup controlling means executes a combustion operation to rise the temperature of reforming means by the combustion heat of the fuel gas when, after the fuel gas is ignited and caused to combust, the reforming state temperature detected by the reforming state temperature detecting means is lower than the PDX starting temperature at which the PDX starts; the startup controlling means executes a normal startup PDX to raise the temperature of the reforming means when the reforming state temperature is equal to or greater than the PDX starting temperature and within a PDX temperature band below the temperature at which steam reforming is possible; the startup controlling means executes a normal startup ATR to raise the temperature of the reforming means when the reforming state temperature is equal to or greater than the temperature at which steam reforming is possible, and is within the ATR temperature band below a predetermined steady state temperature; the startup controlling means executes a normal startup SR to raise the temperature of the reforming means when the reforming state temperature is equal to or greater than the predetermined steady state temperature; wherein, when stop processing by the stop controlling means is executed in association with stopping of the fuel cell module from a high temperature state, and a restart of operation has been executed within the ATR temperature band, the startup controlling means executes a restart control by the SR, skipping the normal startup ATR, at least when the reforming state temperature is in a high temperature region within the ATR temperature band.

According to the solid oxide fuel cell device (SOFC) of the present invention, at the time of restart when stopping from a high temperature state, startup time at restart can be greatly shortened by operating so as to actively utilize residual heat at the time of restart through execution of restart by SR in place of the normal startup ATR, which is skipped.

BRIEF DESCRIPTION OF DRAWINGS

FIG. 9(A) is a data table showing fuel flow, reforming air flow, generating air flow, water flow, and reformer and stack transition temperature conditions in each of the states during normal startup and restart operations of a solid oxide fuel cell (SOFC) according to an embodiment of the present invention;

FIG. 9(B) is a data table showing fuel flow, reforming air flow, generating air flow, water flow, and reformer and stack transition temperature conditions in each of the states during normal startup and restart operations of a solid oxide fuel cell (SOFC) according to an embodiment of the present invention;

EMBODIMENTS OF THE INVENTION

Next, referring to the attached drawings, a solid oxide fuel cell device (SOFC) according to an embodiment of the present invention will be explained.

Figure 1:
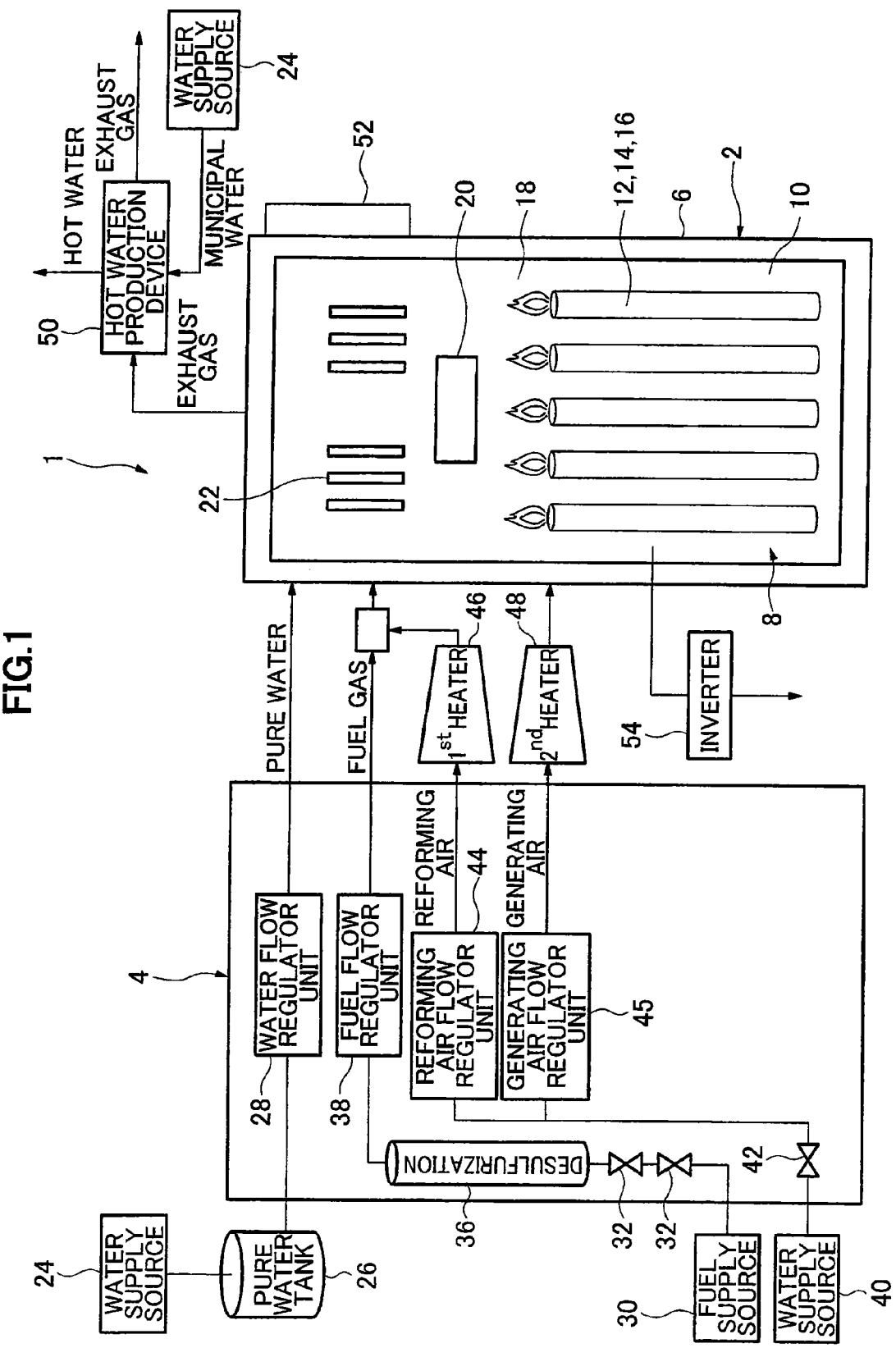
FIG. 1 is an overall schematic showing a solid oxide fuel cell device (SOFC) according to an embodiment of the present invention.

As shown in FIG. 1, a solid oxide fuel cell device (SOFC) according to an embodiment of the present invention is furnished with a fuel cell module 2 and an auxiliary unit 4.

The fuel cell module 2 is furnished with a housing 6; a sealed space 8 is formed within the housing 6, mediated by insulating material (not shown, however the insulating material is not an indispensable structure and may be omitted). Note that it is acceptable to provide no insulating material. A fuel cell assembly 12 for carrying out the power generating reaction between fuel gas and oxidant (air) is disposed in the power generating chamber 10 at the lower portion of this sealed space 8. This fuel cell assembly 12 is furnished with ten fuel cell stacks 14 (see FIG. 5), and the fuel cell stack 14 comprises 16 fuel cell units 16 (see FIG. 4). Thus, the fuel cell assembly 12 has 160 fuel cell units 16, all of which are serially connected.

A combustion chamber 18 is formed above the aforementioned power generating chamber 10 in the sealed space 8 of the fuel cell module 2. Residual fuel gas and residual oxidant (air) not used in the power generation reaction is combusted in this combustion chamber 18 to produce exhaust gas.

A reformer 20 for reforming fuel gas is disposed at the top of the combustion chamber 18; the reformer 20 is heated by the heat of residual gas combustion to a temperature at which the reforming reaction can take place. An air heat exchanger 22 for receiving the heat of combustion and heating the air is further disposed above this reformer 20.

Next, the auxiliary unit 4 is furnished with a pure water tank 26 for holding water from a municipal or other water supply source 24 and filtering it into pure water, and a water flow rate regulator unit 28 (a "water pump" or the like driven by a motor) for regulating the flow rate (litter per minute) of water supplied from the reservoir tank. The auxiliary unit 4 is further furnished with a gas shutoff valve 32 for shutting off the fuel gas supply from a fuel supply source 30 such as municipal gas or the like, a desulfurizer 36 for desulfurizing the fuel gas, and a fuel gas flow rate regulator unit 38 (a "fuel pump" or the like driven by a motor) for regulating the flow rate (litter per minute) of fuel gas. Furthermore, an auxiliary unit 4 is furnished with an electromagnetic valve 42 for shutting off air serving as an oxidant and supplied from an air supply source 40, and a reforming air flow rate regulator unit 44 and generating air flow rate regulator unit 45 ("air blower" or the like driven by a motor) for regulating air flow rate (litter per minute).

Note that in the SOFC according to the embodiment of the present invention, there is no heating means such as a heater for heating the reforming air supply to the reformer 20 or the power generating air supply to the power generating chamber 10 in order to efficiently raise the temperature at startup, nor is there a heating means for separately heating the reformer 20.

Next, a hot-water producing device 50 supplied with exhaust gas is connected to the fuel cell module 2. Municipal water from a water supply source 24 is supplied to this hot-water producing device 50; this water is turned into hot water by the heat of the exhaust gas, and is supplied to a hot water reservoir tank in an external water heater (not shown).

The fuel cell module 2 is provided with a control box 52 for controlling the supply flow rates of fuel gas and the like.

Furthermore, an inverter 54 serving as an electrical power extraction unit (electrical power conversion unit) for supplying electrical power generated by the fuel cell module to the outside is connected to the fuel cell module 2.

Figure 2:
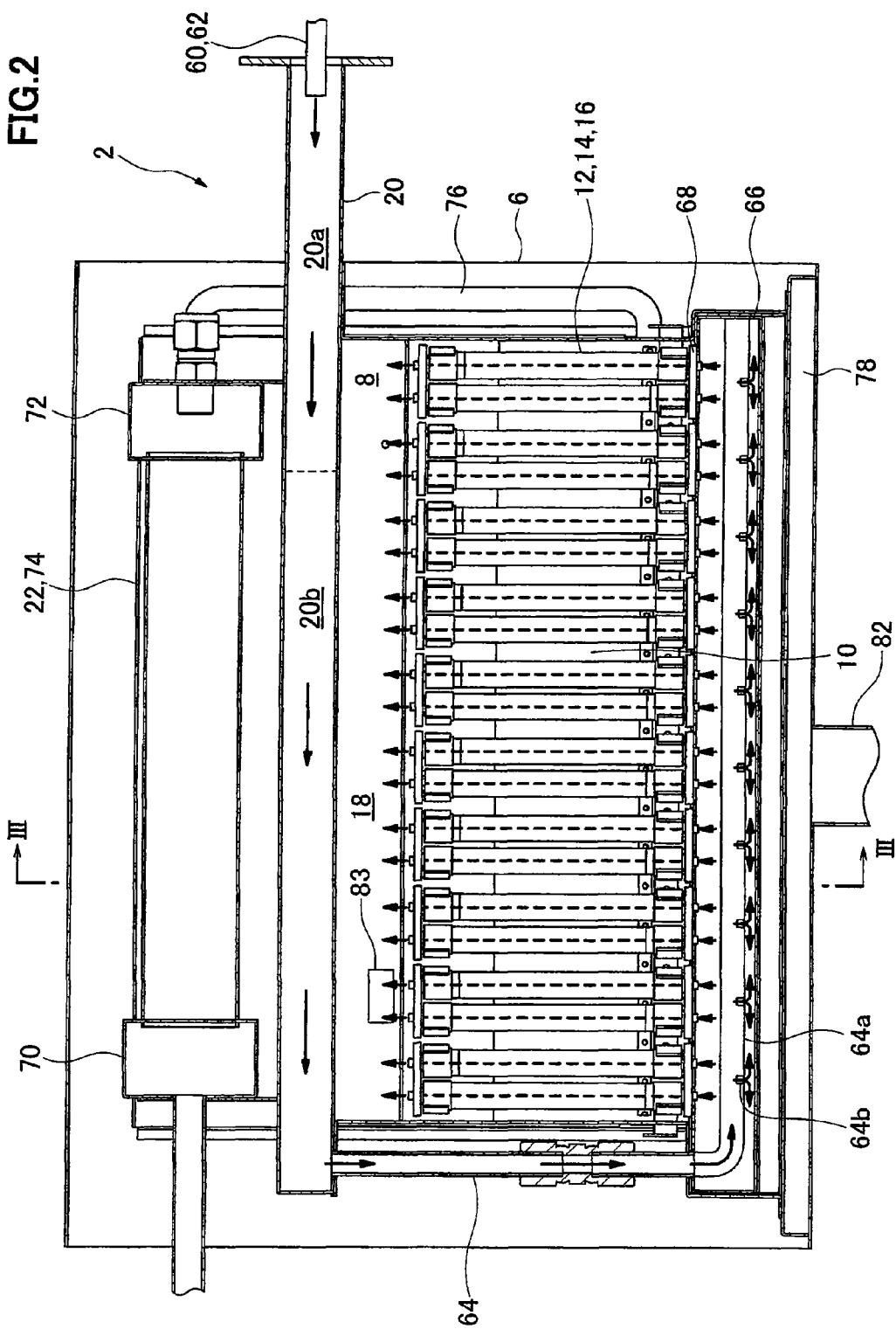
FIG. 2 is a front elevation sectional view showing a solid oxide fuel cell device (SOFC) fuel cell module according to an embodiment of the present invention.
Figure 3:
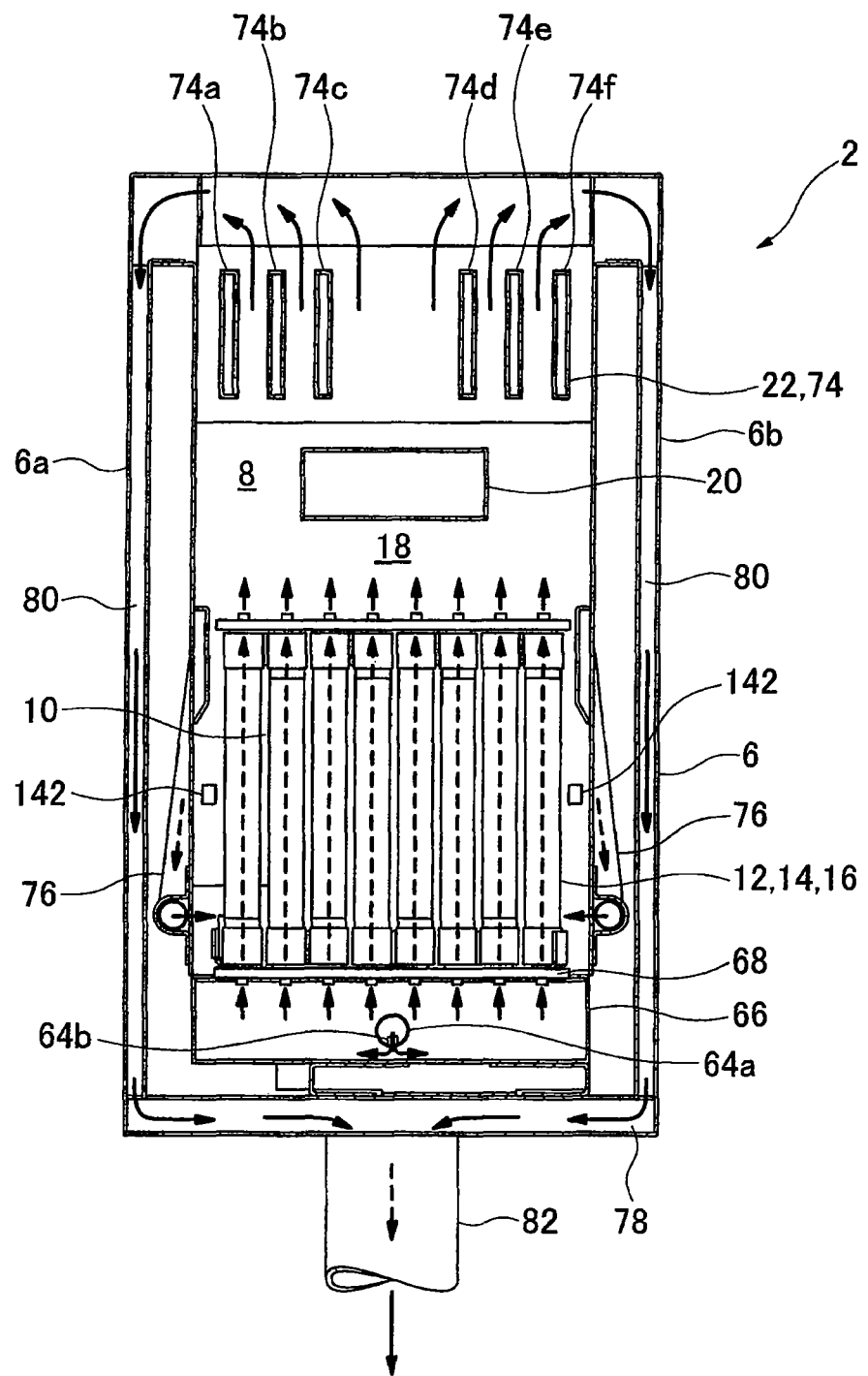
FIG. 3 is a sectional diagram along line III-III in FIG. 2.

The internal structure of the solid oxide fuel cell device (SOFC) according to the embodiment of the present invention is explained using FIGS. 2 and 3.

As shown in FIGS. 2 and 3, a fuel cell assembly 12, a reformer 20, and an air heat exchanger 22 are arranged in sequence starting from the bottom in the sealed space 8 within the fuel cell module 2 housing 6, as described above.

A pure water guide pipe 60 for introducing pure water on the upstream end of the reformer 20, and a reform gas guide pipe 62 for introducing the fuel gas and reforming air to be reformed, are attached to the reformer 20; a vaporizing section 20a and a reforming section 20b are formed in sequence starting from the upstream side within the reformer 20, and the reforming section 20b is filled with a reforming catalyst. Fuel gas and air blended with the steam (pure water) introduced into the reformer 20 is reformed by the reforming catalyst used to fill in the reformer 20. Appropriate reforming catalysts are used, such as those in which nickel is imparted to the surface of alumina spheres, or ruthenium is imparted to alumina spheres.

A fuel gas supply line 64 is connected to the downstream end of the reformer 20; this fuel gas supply line 64 extends downward, then further extends horizontally within a manifold formed under the fuel cell assembly 12. Multiple fuel supply holes 64b are formed on the bottom surface of a horizontal portion 64a of the fuel gas supply line 64; reformed fuel gas is supplied into the manifold 66 from these fuel supply holes 64b.

A lower support plate 68 provided with through holes for supporting the above-described fuel cell stack 14 is attached at the top of the manifold 66, and fuel gas in the manifold 66 is supplied into the fuel cell unit 16.

An air heat exchanger 22 is provided over the reformer 20. The air heat exchanger 22 is furnished with an air concentration chamber 70 on the upstream side and two air distribution chambers 72 on the downstream side; the air concentration chamber 70 and the distribution chambers 72 are connected using six air flow conduits 74. Here, as shown in FIG. 3, three air flow conduits 74 form a set (74a, 74b, 74c, 74d, 74e, 74f); air in the air concentration chamber 70 flows from each set of the air flow conduits 74 to the respective air distribution chambers 72.

Air flowing in the six air flow conduits 74 of the air heat exchanger 22 is pre-heated by rising combustion exhaust gas from the combustion chamber 18.

Air guide pipes 76 are connected to each of the respective air distribution chambers 72; these air guide pipes 76 extend downward, communicating at the bottom end side with the lower space in the generating chamber 10, and introducing preheated air into the generating chamber 10.

Next, an exhaust gas chamber 78 is formed below the manifold 66. As shown in FIG. 3, an exhaust gas conduit 80 extending in the vertical direction is formed on the insides of the front surface 6a and the rear surface 6b which form the faces in the longitudinal direction of the housing 6; the top inside of the exhaust gas conduit 80 communicates with the space in which the air heat exchanger to rule 22 is disposed, and the bottom end side communicates with the exhaust gas chamber 78. An exhaust gas discharge pipe 82 is connected at approximately the center of the bottom surface of the exhaust gas chamber 78; the downstream end of the exhaust gas discharge pipe 82 is connected to the above-described hot water producing device 50 shown in FIG. 1.

As shown in FIG. 2, an ignition device 83 for starting the combustion of fuel gas and air is disposed on the combustion chamber 18. No heating means such as a burner or the like for separately heating the combustion chamber 18 or the fuel cell unit 16 to support ignition at startup or prevent flameout or blow out is provided on the combustion chamber 18.

Figure 4:
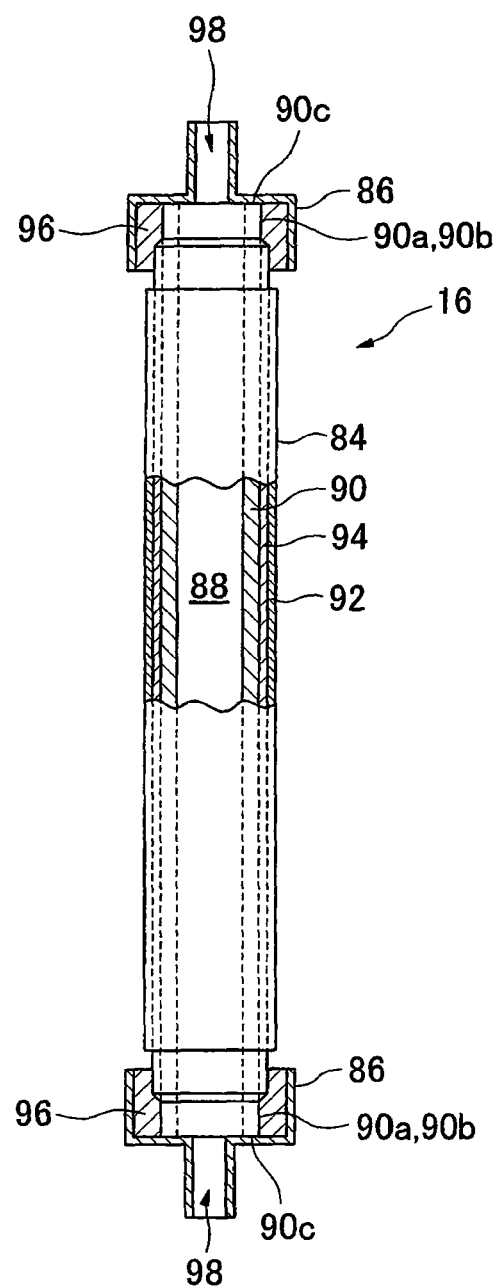
FIG. 4 is a partial section showing a solid oxide fuel cell device (SOFC) fuel cell unit according to an embodiment of the present invention.

Next, referring to FIG. 4, the fuel cell unit 16 will be explained. As shown in FIG. 4, the fuel cell unit 16 is furnished with a fuel cell 84 and internal electrode terminals 86, respectively connected to the respective terminals at the top and bottom of the fuel cell 84.

The fuel cell 84 is a tubular structure extending in the vertical direction, furnished with a cylindrical internal electrode layer 90, on the inside of which is formed a fuel gas flow path 88, a cylindrical external electrode layer 92, and an electrolyte layer 94 between the internal electrode layer 90 and the external electrode layer 92. The internal electrode layer 90 is a fuel electrode through which fuel gas passes, and is a (−) pole, while the external electrode layer 92 is an air electrode for contacting the air, and is a (+) pole.

The internal electrode terminals 86 attached at the top and bottom ends of the fuel cell unit 16 have the same structure, therefore the internal electrode terminal 86 attached at the top end side will be specifically explained. The top portion 90a of the inside electrode layer 90 is furnished with an outside perimeter surface 90b and top end surface 90c, exposed to the electrolyte layer 94 and the outside electrode layer 92. The inside electrode terminal 86 is connected to the outer perimeter surface 90b of the inside electrode layer 90 through a conductive seal material 96, and is electrically connected to the inside electrode layer 90 by making direct contact with the top end surface 90c of the inside electrode layer 90. A fuel gas flow path 98 communicating with fuel gas flow path 88 in the inside electrode layer 90 is formed at the center portion of the inside electrode terminal 86.

The inside electrode layer 90 is formed, for example, from at least one of a mixture of Ni and zirconia doped with at least one type of rare earth element selected from among Ca, Y, Sc, or the like; or a mixture of Ni and ceria doped with at least one type of rare earth element; or any mixture of Ni with lanthanum gallate doped with at least one element selected from among Sr, Mg, Co, Fe, or Cu.

The electrolyte layer 94 is formed, for example, from at least one of the following: zirconia doped with at least one type of rare earth element selected from among Y, Sc, or the like; ceria doped with at least one type of selected rare earth element; or lanthanum gallate doped with at least one element selected from among Sr or Mg.

The outside electrode layer 92 is formed, for example, from at least one of the following: lanthanum manganite doped with at least one element selected from among Sr or Ca; lanthanum ferrite doped with at least one element selected from among Sr, Co, Ni, or Cu; lanthanum cobaltite doped with at least one element selected from among Sr, Fe, Ni, or Cu; Ag, or the like.

Figure 5:
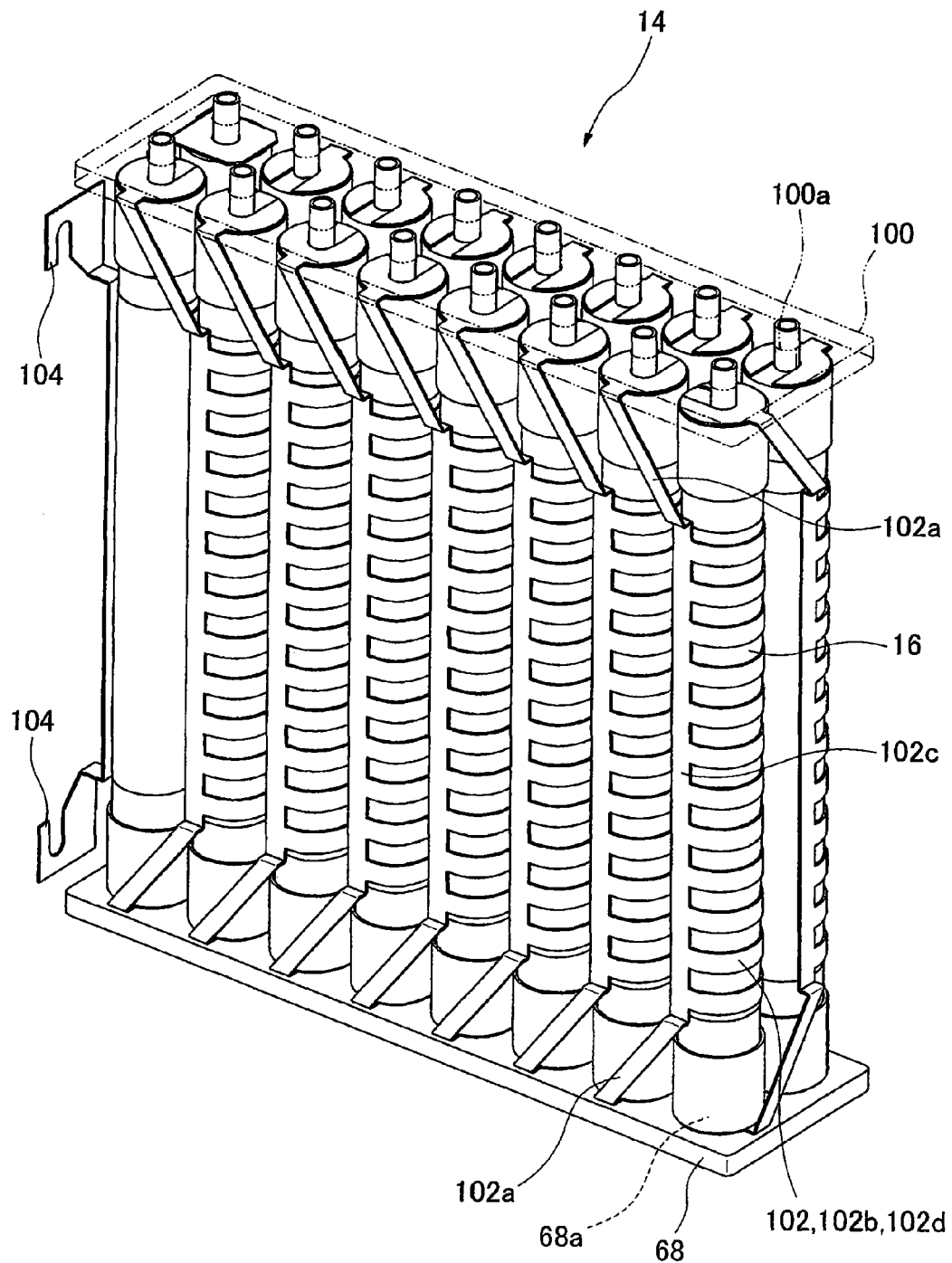
FIG. 5 is a perspective view showing a solid oxide fuel cell device (SOFC) fuel cell stack according to an embodiment of the present invention.

Next, referring to FIG. 5, the fuel cell stack 14 will be explained. As shown in FIG. 5, the fuel cell stack 14 is furnished with sixteen fuel cell units 16; the top sides and bottom sides of these fuel cell units 16 are respectively supported by a lower support plate 68 and upper support plate 100. Through holes 68a and 100a, through which the inside electrode terminal 86 can penetrate, are provided on the lower support plate 68 and upper support plate 100.

In addition, a current collector 102 and an external terminal 104 are attached to the fuel cell unit 16. The current collector 102 is integrally formed by a fuel electrode connecting portion 102a, which is electrically connected to the inside electrode terminal 86 attached to the inside electrode layer 90 serving as the fuel electrode, and by an air electrode connecting portion 102b, which is electrically connected to the entire external perimeter of the outside electrode layer 92 serving as the air electrode. The air electrode connecting portion 102b is formed of a vertical portion 102c extending vertically along the surface of the outside electrode layer 92, and multiple horizontal portions 102d extending in the horizontal direction from the vertical portion 102c along the surface of the outside electrode layer 92. The fuel electrode connecting portion 102a extends linearly in an upward or downward diagonal direction from the vertical portion 102c of the air electrode connecting portion 102b toward the inside electrode terminals 86 positioned in the upper and lower directions on the fuel cell unit 16.

Furthermore, inside electrode terminals 86 at the top and bottom ends of the two fuel cell units 16 positioned at the end of the fuel cell stack 14 (at the front and back sides on the left edge in FIG. 5) are respectively connected to the external terminals 104. These external terminals 104 are connected to the external terminals 104 (not shown) at the ends of the adjacent fuel cell stack 14, and as described above, all of the 160 fuel cell units 16 are connected in series.

Next, referring to FIG. 6, the sensors attached to the solid oxide fuel cell device (SOFC) according to the embodiment of the present invention will be explained.

Figure 6:
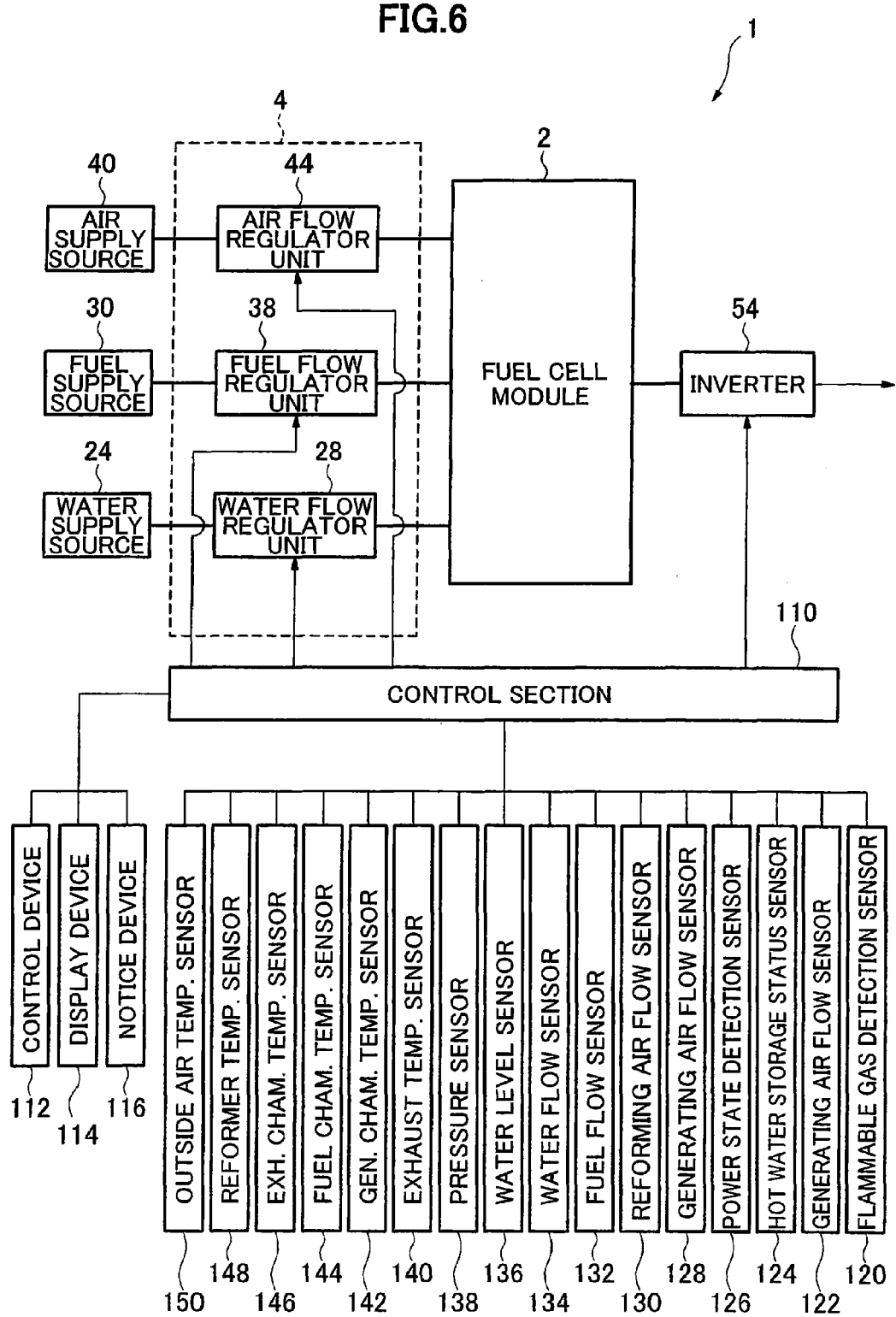
FIG. 6 is a block diagram showing a solid oxide fuel cell device (SOFC) according to an embodiment of the present invention.

As shown in FIG. 6, a solid oxide fuel cell device 1 is furnished with a control unit 110, an operating device 112 provided with operating buttons such as "ON" or "OFF" for user operation, a display device 114 for displaying various data such as a generator output value (Watts), and a notification device 116 for issuing warnings during abnormal states and the like are connected to the control unit 110. The notification device 116 may be connected to a remote control center to inform the control center of abnormal states.

Next, signals from the various sensors described below are input to the control unit 110.

First, a flammable gas detection sensor 120 detects gas leaks and is attached to the fuel cell module 2 and the auxiliary unit 4.

The purpose of the flammable gas detection sensor 120 is to detect leakage of CO in the exhaust gas, which is meant to be exhausted to the outside via the exhaust gas conduit 80 and the like, into the external housing (not shown) which covers the fuel cell module 2 and the auxiliary unit 4.

A water reservoir state detection sensor 124 detects the temperature and amount of hot water in a water heater (not shown).

An electrical power state detection sensor 126 detects current, voltage, and the like in the inverter 54 and in a distribution panel (not shown).

A power generating air flow rate detection sensor 128 detects the flow rate of power generating air supplied to the generating chamber 10.

A reforming air flow rate sensor 130 detects the flow rate of reforming air supplied to the reformer 20.

A fuel flow rate sensor 132 detects the flow rate of fuel gas supplied to the reformer 20.

A water flow rate sensor 134 detects the flow rate of pure water (steam) supplied to the reformer 20.

A water level sensor 136 detects the water level in pure water tank 26.

A pressure sensor 138 detects pressure on the upstream side outside the reformer 20.

An exhaust temperature sensor 140 detects the temperature of exhaust gas flowing into the hot water producing device 50.

As shown in FIG. 3, a generating chamber temperature sensor 142 is disposed on the front surface side and rear surface side around the fuel cell assembly 12, and detects the temperature around the fuel cell stack 14 in order to estimate the temperature of the fuel cell stack 14 (i.e., of the fuel cell 84 itself).

A combustion chamber temperature sensor 144 detects the temperature in combustion chamber 18.

An exhaust gas chamber temperature sensor 146 detects the temperature of exhaust gases in the exhaust gas chamber 78.

A reformer temperature sensor 148 detects the temperature of the reformer 20 and calculates the reformer 20 temperature from the intake and exit temperatures on the reformer 20.

If the solid oxide fuel cell device (SOFC) is placed outdoors, the outside temperature sensor 150 detects the temperature of the outside atmosphere. Sensors to detect outside atmospheric humidity and the like may also be provided.

Signals from these various sensors are sent to the control unit 110; the control unit 110 sends control signals to the water flow rate regulator unit 28, the fuel flow rate regulator unit 38, the reforming air flow rate regulator unit 44, and the power generating air flow rate regulator unit 45 based on data from the sensors, and controls the flow rates in each of these units.

The control unit 110 sends control signals to the inverter 54 to control the supplied electrical power.

Figure 7:
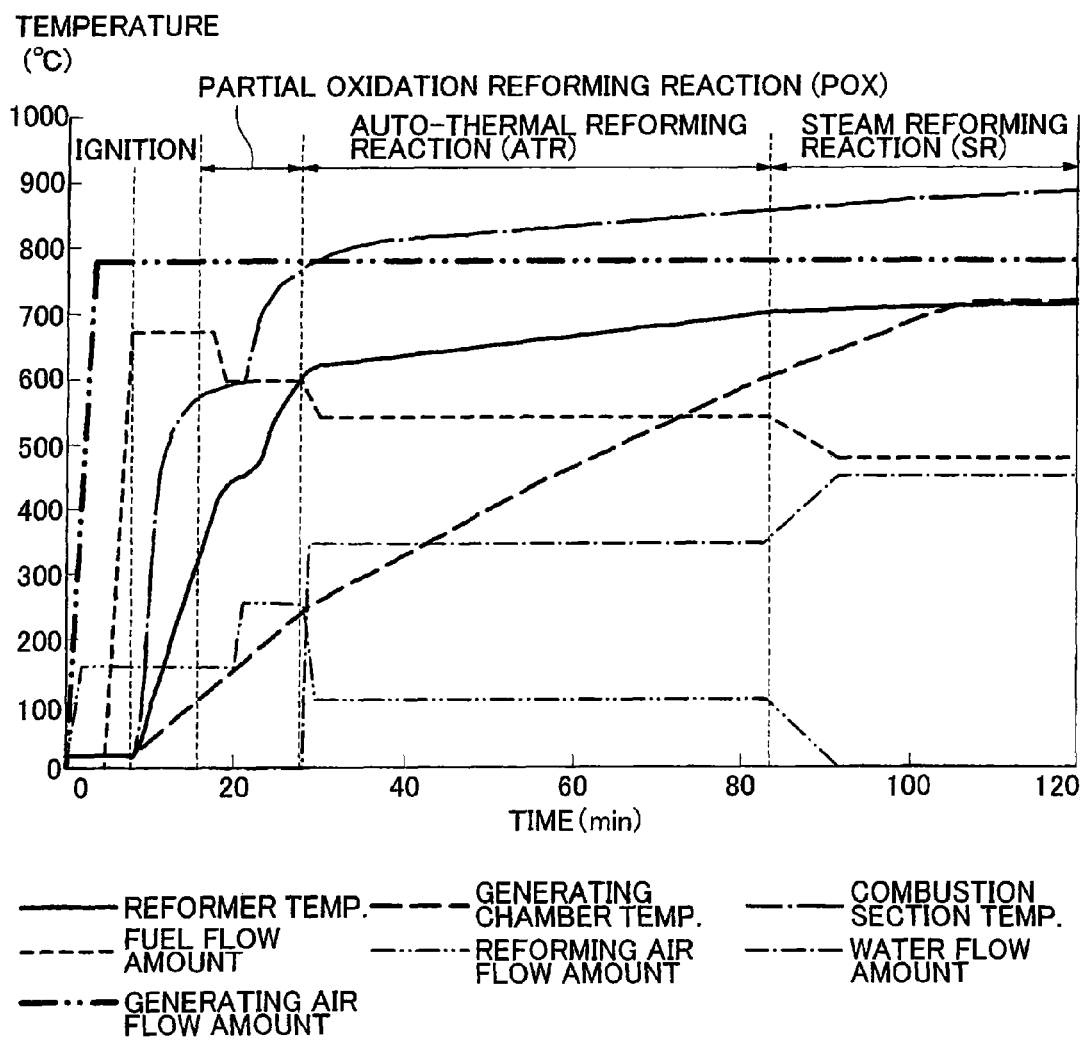
FIG. 7 is a timing chart showing the operation at the time of startup of a solid oxide fuel cell device (SOFC) according to an embodiment of the present invention.

Next, referring to FIG. 7, the operation of a solid oxide fuel cell device (SOFC) according to the present embodiment at the time of startup will be explained.

In order to warm up the fuel cell module 2, the operation starts in a no-load state, i.e., with the circuit which includes the fuel cell module 2 in an open state. At this point current does not flow in the circuit, therefore the fuel cell module 2 does not generate electricity.

First, reforming air is supplied from the reforming air flow rate regulator unit 44 to the reformer 20 on the fuel cell module 2. At the same time, power generating air is supplied from the generating air flow rate regulator unit 45 to an air heat exchanger 22 of the fuel cell module 2, and the power generating air reaches the generating chamber 10 and the combustion chamber 18.

Immediately thereafter, fuel gas is also supplied from the fuel flow rate regulator unit 38, and fuel gas into which reforming air is blended passes through the reformer 20, the fuel cell stack 14, and the fuel cell unit 16 to reach the combustion chamber 18.

Next, ignition is brought about by the ignition device 83, and fuel gas and air (reforming air and power generating air) supplied to the combustion chamber 18 is combusted. This combustion of fuel gas and air produces exhaust gas; the generating chamber 10 is warmed by the exhaust gas, and when the exhaust gas rises into the fuel cell module 2 sealed space 8, the fuel gas, which includes the reforming air in the reformer 20 is warm, as is the power generating air inside the air heat exchanger 22.

At this point, fuel gas into which the reforming air is blended is supplied to the reformer 20 by the fuel flow rate regulator unit 38 and the reforming air flow rate regulator unit 44, therefore the partial oxidation reforming reaction PDX given by Expression (1) proceeds in the reformer 20. This partial oxidation reforming reaction PDX is an exothermic reaction, and therefore has favorable starting characteristics. The fuel gas whose temperature has risen is supplied from the fuel gas supply line 64 to the bottom of the fuel cell stack 14, and by this means the fuel cell stack 14 is heated from the bottom, and the temperature of the combustion chamber 18 has risen by the combustion of the fuel gas and air, and the fuel cell stack 14 is therefore heated from the upper side such that the temperature of the fuel cell stack 14 can be raised in an essentially uniform manner in the vertical direction. Even though the partial oxidation reforming reaction PDX is progressing, the ongoing combustion reaction between fuel gas and air is continued in the combustion chamber 18.

$$C_mH_n + xO_2 \rightarrow aCO_2 + bCO + cH_2 \quad (1)$$

When the reformer temperature sensor 148 detects that the reformer 20 has reached a predetermined temperature (e.g. 600° C.) after the start of the partial oxidation reforming reaction PDX, a pre-blended gas of fuel gas, reforming air, and steam is applied to the reformer 20 by the water flow rate regulator unit 28, the fuel flow rate regulator unit 38, and the reforming air flow rate regulator unit 44. At this point an auto-thermal reforming reaction ATR, which makes use of both the aforementioned partial oxidation reforming reaction PDX and the steam reforming reaction SR described below, proceeds in the reformer 20. This auto-thermal reforming reaction ATR can be internally thermally balanced, therefore the reaction proceeds in a thermally independent fashion inside the reformer 20. In other words, when there is a large amount of oxygen (air), heat emission by the partial oxidation reforming reaction PDX dominates, and when there is a large amount of steam, the endothermic steam reforming reaction SR dominates. At this stage, the initial stage of startup has passed and some degree of elevated temperature has been achieved within the generating chamber 10, therefore even if the endothermic reaction is dominant, there will be no major drop in temperature. Also, the combustion reaction continues within the combustion chamber 18 even as the auto-thermal reforming reaction ATR proceeds.

When the reformer temperature sensor 146 detects that the reformer 20 has reached a predetermined temperature (e.g., 700° C.) following the start of the auto-thermal reforming reaction ATR shown as Expression (2), the supply of reforming air by the reforming air flow rate regulator unit 44 is stopped, and the supply of steam by the water flow rate regulator unit 28 is increased. By this means, a gas containing no air and only containing fuel gas and steam is supplied to the reformer 20, where the steam reforming reaction SR of Expression (3) proceeds.

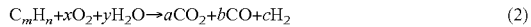

$$C_mH_n + xO_2 + yH_2O \rightarrow aCO_2 + bCO + cH_2 \qquad (2)$$

$$C_mH_n + xH_2O \rightarrow aCO_2 + bCO + cH_2 \qquad (3)$$

This steam reforming reaction SR is an endothermic reaction, therefore the reaction proceeds as a thermal balance is maintained with the heat of combustion from the combustion chamber 18. At this stage, the fuel cell module 2 is in the final stages of startup, therefore the temperature has risen to a sufficiently high level within the generating chamber 10 so that no major temperature drop is induced in the power generating chamber 10 even though an endothermic reaction is proceeding. Also, the combustion reaction continues to proceed in the combustion chamber 18 even as the steam reforming reaction SR is proceeding.

Thus, after the fuel cell module 2 has been ignited by the ignition device 83, the temperature inside the generating chamber 10 gradually rises as a result of the partial oxidation reforming reaction PDX, the auto-thermal reforming reaction ATR, and the steam reforming reaction SR which proceed in that sequence. Next, when the temperature inside the generating chamber 10 and the temperature of the fuel cell 84 reach a predetermined generating temperature which is lower than the rated temperature at which the cell module 2 can be stably operated, the circuit which includes the fuel cell module 2 is closed, power generation by the fuel cell module 2 begins, and current then flows to the circuit. Generation of electricity by the fuel cell module 2 causes the fuel cell 84 to emit heat, such that the temperature of the fuel cell 84 rises. As a result, the rated temperature at which the fuel cell module 2 is operated becomes, for example, 600° C.-800° C.

Following this, fuel gas and air having respective flow rates greater than those consumed by the fuel cell 84 is applied in order to maintain the rated temperature and continue combustion inside the combustion chamber 18. Generation of electricity by the high reform-efficiency steam reforming reaction SR proceeds while electricity is being generated.

Next, referring to FIG. 8, the operation upon stopping the solid oxide fuel cell device (SOFC) according to the embodiment of the present invention will be explained.

Figure 8:
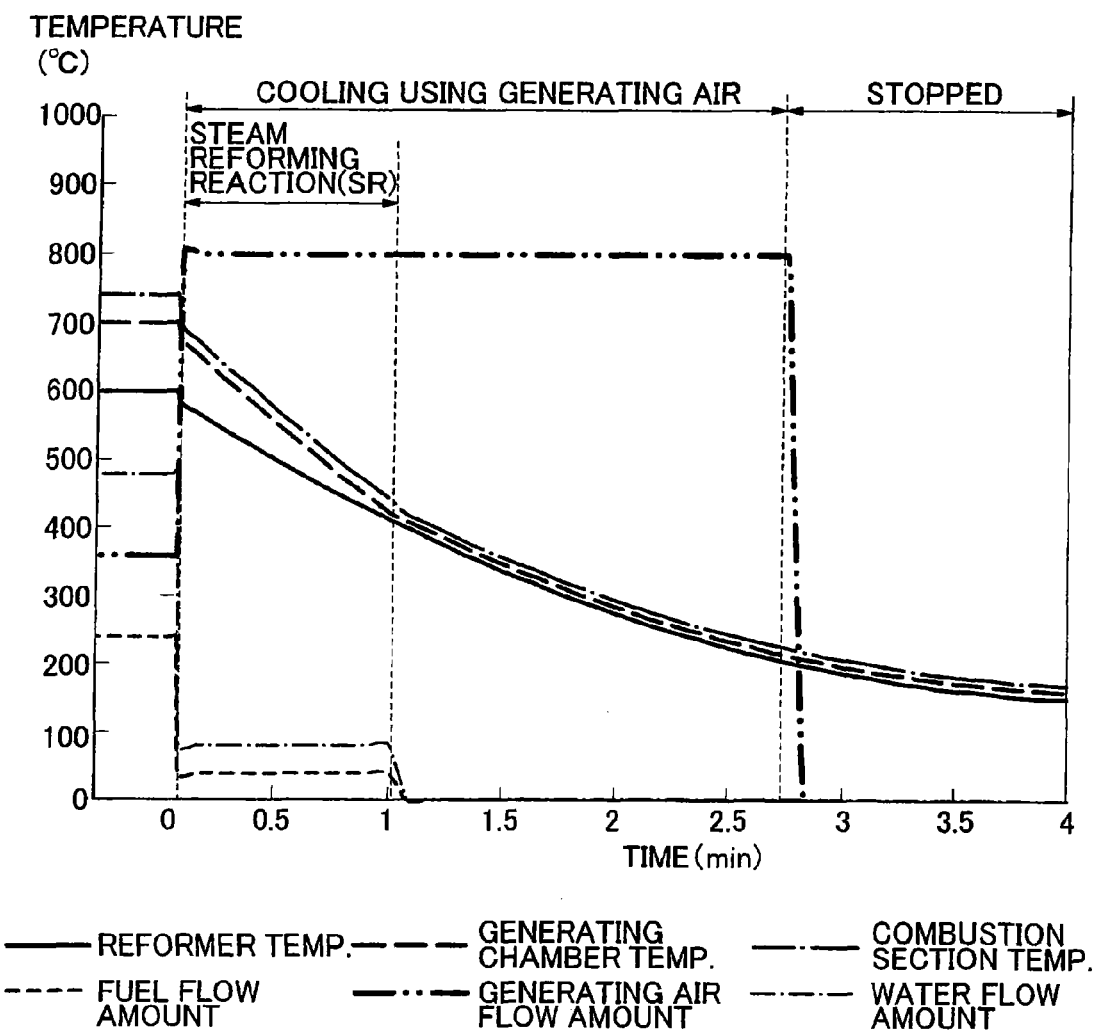
FIG. 8 is a timing chart showing the operation at the time of shutdown of a solid oxide fuel cell device (SOFC) according to an embodiment of the present invention.

As shown in FIG. 8, when stopping the operation of the fuel cell module 2, the fuel flow rate regulator unit 38 and the water flow rate regulator unit 28 are first operated to reduce the flow rates of fuel gas and steam being supplied to the reformer 20.

When stopping the operation of the fuel cell module 2, the flow rate of power generating air supplied by the power generating air flow rate regulator unit 45 into the fuel cell module 2 is being increased at the same time that the flow rates of fuel gas and steam being supplied to the reformer 20 is being reduced; the fuel cell assembly 12 and the reformer 20 are air cooled to reduce their temperature. Thereafter, when the temperature of the generating chamber reaches a predetermined temperature, e.g. 400° C., supply of the fuel gas and steam to the reformer 20 is stopped, and the steam reforming reaction SR in the reformer 20 ends. Supply of the power generating air continues until the temperature in the reformer 20 reaches a predetermined temperature, e.g. 200° C.; when the predetermined temperature is reached, the supply of power generating air from the power generating air flow rate regulator unit 45 is stopped.

Thus in the embodiment of the present invention, the steam reforming reaction SR by the reformer 20 and cooling by power generating air are used in combination, therefore when the operation of the fuel cell module 2 is stopped, that operation can be stopped relatively quickly.

Next, referring to FIGS. 9-13, the operation of a solid oxide fuel cell device (SOFC) according to the present embodiment at the time of restart will be explained. FIGS. 9(A) and 9(B) are data tables showing fuel flow amount, reforming air flow amount, generating air flow amount, water flow amount, and reformer and stack transition temperature conditions in each of the states during normal startup and restart operations of a solid oxide fuel cell device (SOFC) according to the present embodiment.

First, as shown in FIGS. 9(A) and 9(B), the solid oxide fuel cell device (SOFC) according to the present embodiment discloses a control mode (the "Normal Startup Mode 1" below) (see FIG. 9(A)) executing the same as the operation at startup of the solid oxide fuel cell device (SOFC) according to the present embodiment shown in the above-described FIG. 7 as a normal startup operation, and a variant "Normal Startup Mode 2" (see FIG. 9(B)) which executes a normal startup operation based on a normal startup mode different from this normal startup mode 1.

The solid oxide fuel cell device (SOFC) of the present embodiment discloses two embodiments as restart control modes ("Restart Mode 1" and "Restart Mode 2" below) for restarting when there is a call for startup operation in a state whereby a stop operation is being executed ("Restart") in a solid oxide fuel cell device (SOFC) according to the present embodiment shown in FIG. 8; these "Restart Mode 1" and "Restart Mode 2" are respectively executed based on the respective corresponding restart control flow Example 1 and restart control flow Example 2 (discussed in detail below).

Note that details of each normal mode and each restart mode in FIGS. 9(A) and 9(B) are discussed below.

Next, referring to FIG. 10, specifics of a first example of a restart control flow in a solid oxide fuel cell device (SOFC) according to the present embodiment will be explained.

Figure 10:
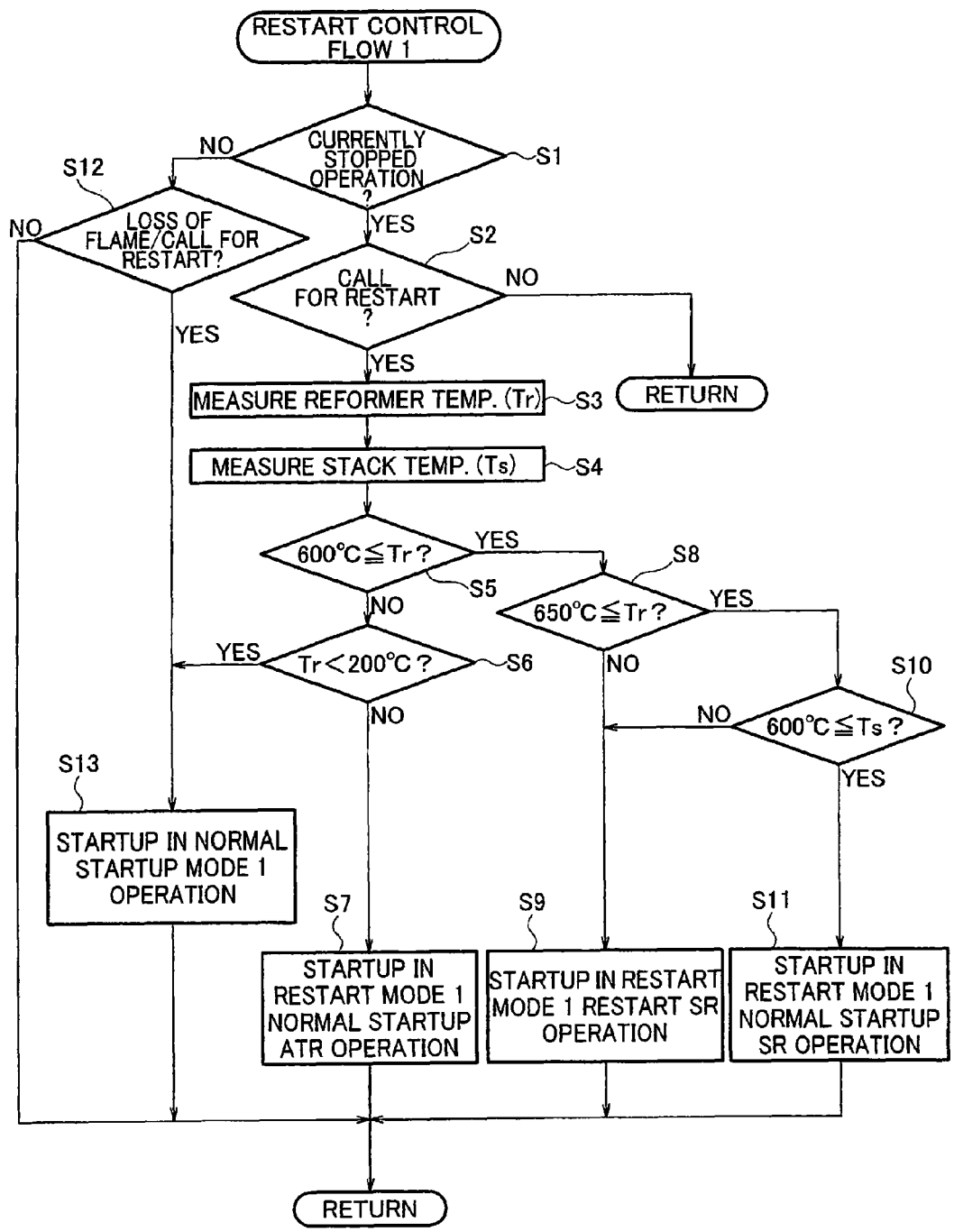
FIG. 10 is a flowchart showing a first example of restart control flow for restarting a solid oxide fuel cell device (SOFC) according to an embodiment of the present invention.

FIG. 10 is a flowchart showing a first example of restart control flow (restart control flow 1) for restarting a solid oxide fuel cell device (SOFC) according to an embodiment of the present invention. In FIG. 10, an S denotes the various steps.

First, in S1, a determination is made as to whether the fuel cell module 2 operation is stopped; if stopped, the system proceeds to S2, and a determination is made as to whether a restart is requested.

If it is determined in S2 that a restart is requested, the system advances to S3; after measuring the temperature of the reformer 20 (the "reformer temperature Tr") using the reformer temperature sensor 148 which forms part of a reforming state temperature detection means for detecting the reforming state temperature in order to change the reforming state of the reformer 20, the system advances to S4 and measures the temperature in the vicinity of the fuel cell stack 14 (i.e., the fuel cells 84 themselves), or the stack temperature Ts, which is the temperature of the electrical generating chamber 10, using a generating chamber temperature sensor 142, which forms part of the reforming state temperature detection means for detecting the reforming state temperature in order to change the reforming state of the reformer 20.

Next, advancing to S5, a determination is made as to whether the reformer temperature Tr is equal to or greater than 600° C.

In S5, if it is determined that the reformer temperature Tr is not equal to or greater than 600° C., the system advances to S6 and determines if the reformer temperature Tr is less than 200° C.

If it is determined in S6 that the reformer temperature Tr is not less than 200° C., i.e., that the reformer temperature Tr is equal to or greater than 200° C. and less than 600° C., the system advances to S7, and a "Normal Startup ATR" according to the "Restart Mode 1" in the data table shown in FIG. 9(A) is executed.

On the other hand, if it is determined in S5 that the reformer temperature Tr is equal to or greater than 600° C., the system advances to S8 and determines if the reformer temperature Tr is equal to or greater than 650° C.

If it is determined in S8 that the reformer temperature Tr is not equal to or greater than 650° C., i.e., that the reformer temperature Tr is equal to or greater than 600° C. and less than 650° C., the system advances to S9, and a "Restart SR" according to "Restart Mode 1" in the data table shown in FIG. 9(A) is executed.

On the other hand, if it is determined in S8 that the reformer temperature Tr is equal to or greater than 650° C., the system advances to S10 and determines whether the stack temperature Ts measured by the generating chamber temperature sensor 142 is equal to or greater than 600° C.

If it is determined in S10 that the stack temperature Ts is equal to or greater than 600° C., the system advances to S11, and "Normal Startup SR" is executed according to the "Restart Mode 1" in the data table shown in FIG. 9(A). On the other hand, if it is determined in S10 that the stack temperature Ts is not equal to or greater than 600° C., i.e., that the stack temperature Ts is less than 600° C. notwithstanding that the reformer temperature Tr is equal to or greater than 600° C., the system advances to S9, and a "Restart SR" is executed according to the "Restart Mode 1" in the data table shown in FIG. 9(A).

Next, a determination is made in S1 as to whether the fuel cell module 2 operation is stopped; if not stopped, the system advances to S12 and determines whether a restart is requested based on loss of flame during startup.

When it is determined in S12 that a restart is requested based on loss of flame during startup, or it is determined in S6 that the reformer temperature Tr is less than 200° C., it is not the case that all the entire fuel cell module is in a long duration high temperature state even though the apparent value of the temperature sensor is high, therefore heat is not accumulated uniformly, so restart control based on residual heat cannot be executed, and the system advances to S13, where a restart is executed based on the "Restart Mode 1" in the data table shown in FIG. 9(A).

Figure 11:
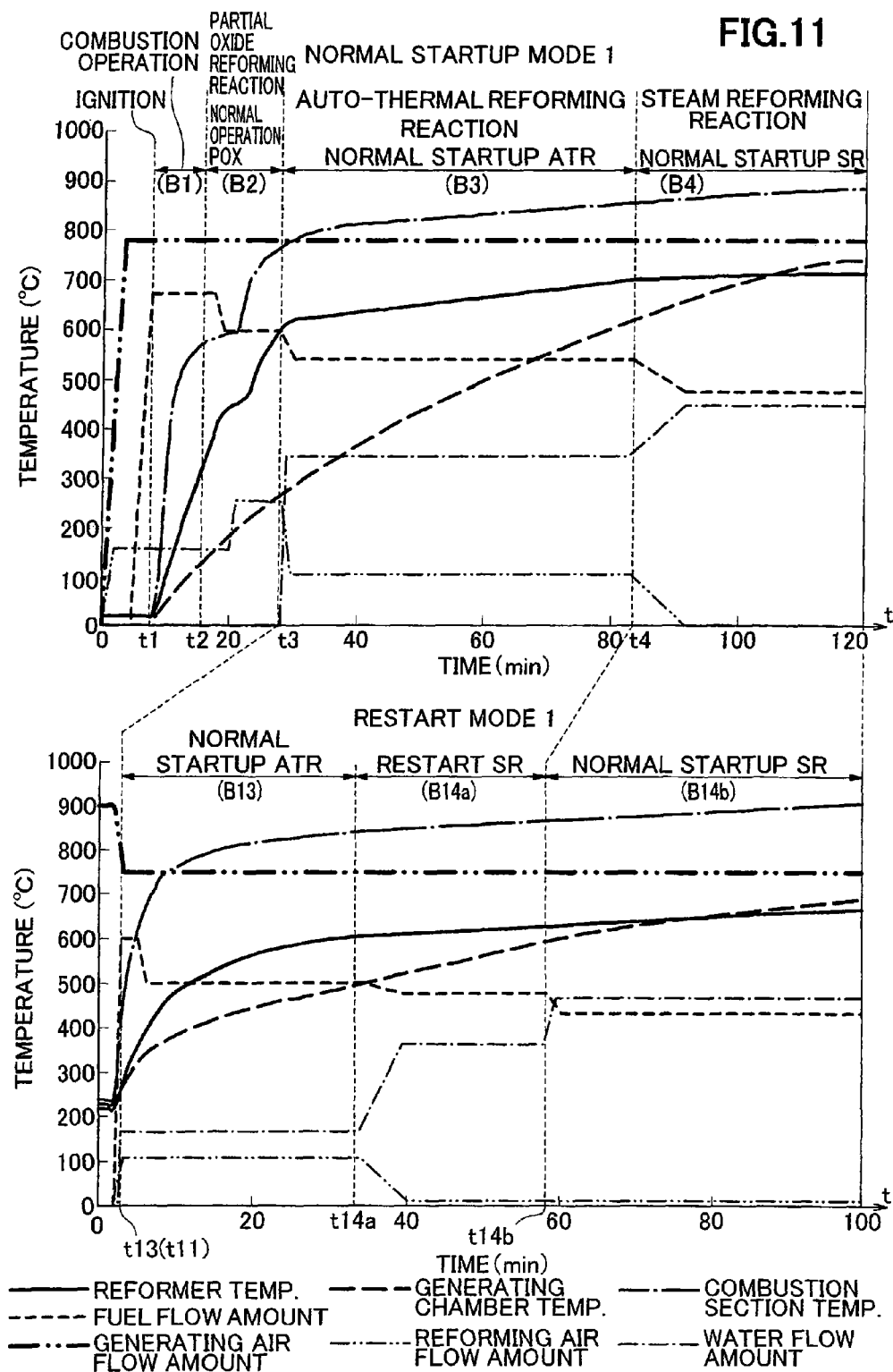
FIG. 11 is a diagram comparing a timing chart showing operations when restart is executed according to the first example restart control flow for the solid oxide fuel cell device (SOFC) according to the embodiment of the present invention shown in FIG. 10 to a timing chart showing normal startup operations.

Next, referring to FIGS. 9-11, the operation when a restart is executed based on a first example of the restart control flow of the solid oxide fuel cell device (SOFC) according to this embodiment as shown in FIG. 10 will be specifically explained.

FIG. 11 is a figure comparing a timing chart showing operation when restart is executed based on a first example of the restart control flow in a solid oxide fuel cell device (SOFC) according to the embodiment of the present invention shown in FIG. 10, with a timing chart showing normal startup operations.

Note that the timing chart in the upper portion of FIG. 11 shows the normal startup operation of a solid oxide fuel cell device (SOFC) when the "Normal Startup Mode 1" in the data table shown in FIG. 9(A) is executed, and the timing chart in the bottom portion of FIG. 11 is a timing chart showing the restart operation of a solid oxide fuel cell device (SOFC) when the "Restart Mode 1" in the data table shown in FIG. 9(A) is executed.

For an explanation of the restart operation based on the first example restart control flow (restart flow 1) of the solid oxide fuel cell device (SOFC) of the present embodiment, referring only to the data table regarding the "Normal Startup Mode 1" and "Restart Mode 1" shown in FIG. 9(A), the restart operation under "Restart Mode 1" of the solid oxide fuel cell device (SOFC) of the present embodiment shown in FIG. 11 is explained by comparing it with the operation in normal startup according to the "Normal Startup Mode 1."

First, how to read the "Normal Startup Mode 1" data table shown in FIG. 9(A) will be explained.

The "State" column under "Normal Startup Mode 1" shown in FIG. 9(A) shows the respective operating states upon normal startup from the top section to the bottom section in temporal order; the various operating states are separated into categories abbreviated as "Time of Ignition," "Combustion Operation," "Normal Startup PDX," "Normal Startup ATR," and "Normal Startup SR."

Note that the times t shown along the horizontal axis of the timing chart in the "Normal Startup 1" in FIG. 11 are referred to as t1 for the "Time of Ignition," then t2, t3, and t4 for the sequential transitions through "Normal Startup PDX," "Normal Startup ATR," and "Normal Startup SR;" the temperature of the reformer 20 detected by the reformer temperature sensor 148 at a time t is referred to as Tr(t), and the stack temperature measured by the generating chamber temperature sensor 142 at a time t is referred to as Ts(t).

The operating state shown in FIG. 9(A) referred to as "Time of Ignition" of the "Normal Startup Mode 1" is the state which turns on the ignition device 83, ignites the fuel gas, and starts combustion; if the temperature of the reformer 20 detected by the reformer temperature sensor 148 at the time of this ignition (t=t1) is deemed "temperature at time of ignition Tr(t1)," then this temperature at time of ignition Tr(t1) is lower than the temperature of the reformer 20 at the start of PDX (t=t2)) (the "PDX Starting Temperature Tr(t2)" below) (=300° C.).

Next, the "Combustion Operation" operating state of the "Normal Startup Mode 1" is one in which, after starting combustion following ignition of the fuel gas, startup is controlled in a control band (the "Combustion Operation Control Band B1" below) for executing a combustion operation by heating the reformer 20 through combustion of this fuel gas; this is executed in a temperature band W1 in which the temperature of the reformer 20 detected by the reformer temperature sensor 148 is between the temperature at the time of ignition Tr(t1) up to a temperature below the PDX starting temperature Tr(t2) (=300° C.).

Next, the operating state referred to as the "Normal Startup PDX" of the "Normal Startup Mode 1" is one in which, when in a temperature band (the "Normal Startup PDX temperature band W2 (300° C.≤Tr(t)<600° C.) in which the temperature Tr(t) of the reformer 20 detected by the reformer temperature sensor 148 is equal to or greater than the PDX starting temperature Tr(t2) (=300° C.) and less than the temperature at which SR is possible (the "SR Feasible Temperature Tr(t3)" below) (=600° C.) (i.e., 300° C.≤Tr(t)<600° C.), startup is controlled in a control band (the "Normal Startup Mode PDX Control Band B2" below) in which PDX is executed by heating the reformer 20 using the reaction heat from PDX and the combustion heat of the fuel gas.

Next, the operating state referred to as the "Normal Startup ATR" of the "Normal Startup Mode 1," is one in which, when in a temperature band in which the temperature Tr(t) of the reformer 20 detected by the reformer temperature sensor 148 is equal to or greater than the SR Feasible Temperature Tr(t3) (=600° C.) and less than a predetermined steady state temperature Tr(t4) (=650° C.) (i.e., 600° C.≤Tr(t)<650° C.); and in a temperature band (250° C.≤Ts<600° C.) in which the stack temperature Ts measured by the generating chamber temperature sensor 142 is in a band equal to or greater than 250° C. and less than 600° C. (the "Normal Startup ATR Temperature Band W3" below), the reaction heat from PDX, the combustion heat of fuel gas, and the absorption of heat by SR are controlled to heat the reformer 20, and startup is controlled in the control band for executing ATR (the "Normal Startup Mode ATR Control Band B3" below).

Next, the operating state referred to as "Normal Startup SR" of the "Normal Startup Mode 1" is one in which, when the temperature Tr(t) of the reformer 20 detected by the reformer temperature sensor 148 is at a predetermined steady state temperature Tr(t4) equal to or greater than 650° C., and the stack temperature Ts measured by the generating chamber temperature sensor 142 is equal to or greater than 600° C., startup is controlled in the control band (the "Normal Startup Mode SR Control Band B4" below) in which SR is executed.

Note that in the "Fuel Flow Amount" column in FIGS. 9(A) and 9(B), what is shown is the flow amount (L/min) of fuel gas supplied to the reformer 20 from the fuel flow regulator unit 38 serving as the fuel gas supply means of the auxiliary unit 4.

The "Reforming Air Flow Amount" column in FIGS. 9(A) and 9(B) shows the flow amount (L/min) of oxidant gas (reforming air) supplied from the reforming air flow regulator unit 44, which serves as the oxidant gas supply means for the auxiliary unit 4, to the reformer 20 via the first heater 46, which serves as oxidizing gas heating means.

Furthermore, the "Generating Air Flow Amount" column in FIGS. 9(A) and 9(B) shows, for each operating state, the flow amount (L/min) of generating air supplied from the generating air flow regulator unit 45 of the auxiliary unit 4 to the electrical generating chamber 10 via the second heater 48.

The "Water Flow Amount" column in FIGS. 9(A) and 9(B) shows the flow amount (cc/min) of pure water supplied to the reformer 20 from the water flow regulator unit 28 of the auxiliary unit 4, which is the water supply means for producing pure water and supplying it the reformer 20.

Furthermore, the "Reformer Temperature" and "Stack Temperature" columns under "Transition Temperature Conditions" shown in FIGS. 9(A) and 9(B) indicate the reformer 20 temperature Tr and fuel cell stack 14 temperature Ts when the operating state transitions to the next operating state.

To explain this more specifically, the "Reformer Temperature" in the "Transition Temperature Conditions" in the state column under "Combustion Operation" of the "Normal Startup Mode 1" shows "300° C. or greater," but when this reaches a reformer 20 temperature Tr(t) of 300° C. or greater as detected by the reformer temperature sensor 148, the "Combustion Operation" operating state transitions to "Normal Startup PDX."

Similarly, the "Reformer Temperature" in "Transition Temperature Conditions" entry under the "Normal Startup PDX" of the "Normal Startup Mode 1" state column shows "600° C. or greater," and the "Stack Temperature" shows "250° C. or greater," but this means that a transition from the "Normal Startup PDX" operating state to the "Normal Startup ATR" operating state occurs when the reformer 20 temperature Tr(t) detected by the reformer temperature sensor 148 reaches 600° C. or greater, and the stack temperature Ts measured by the generating chamber temperature sensor 142 reaches 250° C. or greater.

Next the reading of the "Restart Mode 1" data table shown in FIG. 9(A) will be explained, but because this is basically the same as the reading of the "Normal Startup Mode 1" described above, we will focus on the points of difference and features relative to the "Normal Startup Mode 1" data table.

First, the "State" column in the "Restart Mode 1" column shown in FIG. 9(A) shows the respective operating states upon restart from the top row to the bottom row in temporal order; the various operating states are abbreviated as "Time of Ignition," "Normal Startup ATR," "Restart SR," and "Normal Startup SR."

Note that with respect to the times t on the horizontal axis of the "Restart Mode 1" timing chart, the time of the "Time of Ignition" is referred to as t11, and the times at which the transitions occur in sequence to "Normal Startup ATR," "Restart SR," and "Normal Startup SR," are respectively referred to as t13, t14a and t14b.

Next, the operating state shown in FIG. 9(A) and referred to as "Time of Ignition" under "Restart Mode 1" is one in which, when a restart is requested while the fuel cell module 2 operation is stopped, a normal startup based on the "Normal Startup Mode 1" is executed starting with the "Combustion Operation" following ignition in the "Normal Startup Model" (see S6 and S13 in FIG. 10) when the temperature Tr(t) of the reformer 20 detected by the reformer temperature sensor 148 is less than a predetermined temperature Tr(t11) (=200° C.), which is less than the above-described PDX starting temperature Tr(t2) (=300° C.) in the normal startup mode PDX control band B2 of the "Normal Startup Mode."

On the other hand, when the reformer 20 temperature Tr(t11) is equal to or greater than a predetermined temperature (=200° C.), there is a transition to the "Normal Startup ATR" operating state of the "Restart Mode 1" (see FIG. 10 S6 and S7) immediately after the ignition device 83 turns on and the fuel gas is ignited.

Next, the operating state shown in FIG. 9(A) and S7 of FIG. 10 and referred to as "Normal Startup ATR" under "Restart Mode 1" is one in which, when the temperature of the reformer 20 Tr(t11) detected by the reformer temperature sensor 148 is equal to or greater than a predetermined temperature (=200° C.), there is an immediate transition, after the ignition device 83 turns on and the fuel gas is ignited, and restart is controlled in the control band in which ATR is executed (the "Restart Mode ATR Control Band B13" below).

In this "Normal Startup ATR" executed in the restart mode ATR control band B13 of the "Restart Mode 1", only the temperature band of the reformer temperature Tr and stack temperature Ts differ from the "Normal Startup ATR" executed in the normal startup mode ATR control band B3 of the "Normal Startup Mode 1"; the "Fuel Flow Amount," "Reforming Air Flow Amount," "Generating Air Flow Amount," and "Water Flow Amount" are the same.

More specifically, while it is true that the temperature band of the reformer temperature Tr and stack temperature Ts (the "Normal Startup ATR Temperature Band W13" below) in which the "Normal Startup ATR" is executed in the restart mode ATR control band B13 of the "Restart Mode 1" is a temperature band (200° C.≤Tr<600° C., Ts<250° C.) overlapped in part with the band of reformer temperature Tr by the normal startup PDX temperature band W2 (300° C.≤Tr(t)<600° C.; Ts<250° C.) in which a "Normal Startup PDX" is executed in the normal startup mode PDX control band B2 in the "Normal Startup Mode 1," only the stack temperature Is overlaps in part with the normal startup ATR temperature band W3 (600° C.≤Tr(t)<650° C.; 250° C.≤Ts<600° C.) in which the "Normal Startup ATR" is executed in the normal startup mode ATR control band B3 of the "Normal Startup Mode 1."

Next, the operating state referred to as "Normal Startup SR" of the "Restart Mode 2" shown in FIG. 9(A) and S9 in FIG. 10, controls restart in the control band (the "Restart Mode SR Control Band B14a" below) for executing an SR different from the "Normal Startup SR" in the "Normal Startup Mode 1."

More specifically, the temperature band of the reformer temperature Tr and stack temperature Ts (the "Restart SR temperature band W14" below) in which the "Restart SR" is executed in the restart mode ATR control band B14a of the "Restart Mode 1" is a temperature band (600° C.≤Tr(t)<650° C.; 500° C.<Ts<600° C.) which partially overlaps with the normal startup ATR temperature band W3 (600° C.≤Tr(t)<650° C.; 250° C.≤Ts<600° C.) in which the "Normal Startup ATR" is executed in the normal startup mode ATR control band B3 of the "Normal Startup Mode 1."

In the restart mode SR control band B14a of the "Restart Mode 1", the "Normal Startup ATR" of the "Normal Startup Mode 1" is not executed even though, in particular, there is a portion of the restart ATR temperature band W14a (600° C.≤Tr(t)<650° C.; 500° C.≤Ts<600° C.) in which the "Restart SR" of the "Restart Mode 1" is executed which overlaps the normal startup ATR temperature band W3 (600° C.≤Tr(t)<650° C.; 250° C.≤Ts<600° C.) in which the "Normal Startup SR" of the "Normal Startup Mode 1" is executed.

In addition, as shown in FIG. 9(A), the "Fuel Flow Amount" in the "Restart SR" operating state of the "Restart Mode 1" is 3.5 L/min, which is less than the "Fuel Flow Amount" in the "Normal Startup ATR" operating state of the "Normal Startup Mode 1" (4.0 L/min) and more than the "Fuel Flow Amount" in the "Normal Startup SR" operating state of the "Normal Startup Mode 1" (3.0 L/min).

In addition, as shown in FIG. 9(A), the "Water Flow Amount" in the "Restart SR" operating state of the "Restart Mode 1" is 6.0 cc/min, which is more than the "Water Flow Amount" in the "Normal Startup ATR" operating state of the "Normal Startup Mode 1" (3.0 cc/min) and less than the "Water Flow Amount" in the "Normal Startup SR" operating state of the "Normal Startup Mode 1" (8.0 cc/min).

Next, the "Normal Startup SR" of the "Restart Mode 1" operating state shown in FIG. 9(A) and S11 of FIG. 10 is one in which the temperature band of the reformer temperature Tr and stack temperature Ts (the "Normal Startup SR temperature band W14b" below) is the same as the normal startup SR temperature band W4 of the "Normal Startup Mode 1" (650° C.≤Tr(t), 600≤Ts), whereby restart is controlled in a control band (the "Restart Mode ATR Control Band B14b" below) for executing an SR which is the same as the "Normal Startup SR" of the "Normal Startup Mode 1."

Next it is focused particularly on the above-described control band (the "Restart Mode Control Band of the "Restart Mode 1"" below) for the execution, under "Restart Mode 1," starting from "Normal Startup ATR," via "Restart SR," to "Normal Startup SR," comparing a restart under this restart mode control band with a normal startup under the "Normal Startup Mode 1."

When, in the restart mode control band of the "Restart Mode 1," the reformer 20 temperature Tr and the stack temperature Ts are within the normal startup ATR temperature band W3, having dropped from the high temperature side of the temperature band corresponding to the normal startup ATR temperature band W3 (600° C.≤Tr(t)<650° C.; 250° C.≤Ts<600° C.) of the "Normal Startup Mode 1" due to stopping of the operation of the fuel cell module 2, execution of the "Normal Startup ATR" in the normal startup mode ATR control band B3 under the "Normal Startup Mode 1" is skipped by actively utilizing residual heat in the fuel cell stack 14 or the reformer 20, even when reformer temperature Tr and stack temperature Ts are within the normal startup ATR temperature band W3 (600° C.≤Tr(t)<650° C.; 250° C.≤Ts<600° C.).

Then, instead of this skipped "Normal Startup ATR" of the "Normal Startup Mode 1," in the restart SR temperature band W14a of the "Restart Mode 1" (600° C.≤Tr(t)<650° C.; 500° C.≤Ts<600° C.) a "Restart SR" of the "Restart Mode 1" is executed in which the "Fuel Flow Amount" is less than in the "Normal Startup ATR" of the "Normal Startup Mode 1" and more than the "Normal Startup SR" of the "Normal Startup Mode 1," and the "Water Flow Amount" is more than in the "Normal Startup ATR" of the "Normal Startup Mode 1" and less than in the "Normal Startup SR" of the "Normal Startup Mode 1."

However, in the series of restart mode control bands in "Restart Mode 1," ATR is not completely prohibited, and a "Normal Startup ATR" of the "Restart Mode 1" is executed when the reformer temperature Tr and stack temperature Ts are within the restart ATR temperature band W13 (200° C.≤Tr(t)<600° C.; Ts<500° C.)), which is a temperature band on the low temperature side below the restart SR temperature band W14a of the "Normal Startup Mode 1" (600° C.≤Tr(t)<650° C.; 500° C.≤Ts<600° C.).

On the other hand, in the series of restart mode control bands in "Restart Mode 1," when a restart has been executed based on loss of flame at startup, the possibility is low that residual heat remaining in the fuel cell stack 14 or the reformer 20 can be used even if the reformer 20 temperature Tr and the stack temperature Ts rose from the low temperature side of the restart ATR temperature band W14a of the "Restart Mode 1" and were within the restart ATR temperature bands W14a or W14b, therefore "Restart SR" and "Normal Startup SR" in the restart mode control band of the "Normal Startup Mode 1" are prohibited, and execution starts with the "Combustion Operation" after ignition in "Normal Startup Mode 1" (see FIG. 10, S12 and S13).

Also, as shown in FIG. 11, the time t14a over which the transition from the "Normal Startup ATR" of the "Restart Mode 1" to the "Restart SR" occurs is also shorter than the time t4 over which the transition from the "Normal Startup ATR" of the "Normal Startup Mode 1" to the "Normal Startup SR" occurs, and the startup time for restart is shorter compared to the startup time for normal startup.

According to the restart control, using the first example of the restart control flow in the solid oxide fuel cell device (SOFC) of the above-described present embodiment, the reformer temperature Tr and stack temperature Ts are in the restart SR temperature band W14a (600° C.≤Tr(t)<650° C.; 500° C.≤Ts<600° C.), having dropped from the high temperature side of the restart SR temperature band W14a overlapping with the normal startup ATR temperature band W3 of the "Normal Startup Mode 1" (600° C.≤Tr(t)<650° C.; 250° C.≤Ts<600° C.), a "Normal Startup ATR" in the normal startup mode ATR control band B2 of the "Normal Startup Mode 1" can, through active utilization of the residual heat remaining in individual fuel cell stacks 14 or the reformer 20, be skipped, even when the reformer temperature Tr and stack temperature Ts are in the normal startup ATR temperature band W3 (600° C.≤Tr(t)<650° C.; 250° C.≤Ts<600° C.).

Then, instead of this skipped "Normal Startup ATR" of the "Normal Startup Mode 1," in the restart ATR temperature band W14a of the "Restart Mode 1" the "Restart SR" of the "Restart Mode 1" can be executed in which the "Fuel Flow Amount" is less than in the "Normal Startup ATR" of the "Normal Startup Mode 1" and more than in the "Normal Startup SR" of the "Normal Startup Mode 1," and in which the "Water Flow Amount" is more than in the "Normal Startup ATR" of the "Normal Startup Mode 1" and less than in the "Normal Startup SR" of the "Normal Startup Mode 1."

As a result, when compared to the case in which a normal startup ATR is executed upon restart as is without skipping the execution of the normal startup ATR in the normal startup mode ATR control band B3 of the "Normal Startup Mode 1," oxidation of the fuel cells 84 and the burden on the fuel cells 84 caused by anomalously high temperatures can be reduced, and the durability of the fuel cells 84 improved.

Also, by actively utilizing residual heat remaining in the fuel cell stack 14 or the reformer 20, the "Combustion Operation," "Normal Startup PDX," and "Normal Startup ATR in the "Normal Startup Mode 1" can be skipped and, by executing the sequence from "Time of Ignition" to "Normal Startup ATR," "Restart SR," and "Normal Startup SR," in "Restart Mode 1," the transition from the time of ignition to ATR and SR can be speeded up. As a result, compared to the hypothetical case in which, upon restart, a "Normal Startup ATR" of the "Normal Startup Mode 1" is executed within a temperature band corresponding to the normal startup ATR temperature band W3 in a "Normal Startup Mode 1," the startup time needed to for restart can be greatly shortened.

On the other hand, when a restart is executed based on loss of flame at startup, a "Restart ATR" and "Normal Startup SR" in the restart mode control band of the "Normal Startup Mode 1" can be prohibited, therefore damage to the individual fuel cells 16 can be restrained.

Furthermore, in the restart control according to a first example of the restart control flow of the solid oxide fuel cell device (SOFC) of the present embodiment, execution at the time of restart in the "Restart Mode 1" of the sequence "Restart ATR," "Restart SR," and "Normal Startup SR" as the reformer temperature TR and the stack temperature Ts rise from the "Time of Ignition" enables a stable temperature recovery without inducing temperature drops in the individual fuel cell units 16.

Moreover, in the restart control according to a first example of the restart control flow of the solid oxide fuel cell device (SOFC) of the present embodiment, a "Normal Startup ATR" of the "Restart Mode 1" is executed in the normal startup ATR control band W13 in the restart mode ATR control band B 13 of the "Restart Mode 1" (200° C.≤Tr(t)<600° C.; Ts<500° C.), and a "Restart SR" of the "Restart Mode 1" is executed in the restart SR temperature band W14a in the restart mode SR control band B14a of the "Restart Mode 1" (600° C.≤Tr(t)<650° C.; 500° C.≤Ts<600° C.), therefore a stable temperature recovery in an optimal state can be achieved without inducing sudden temperature drops in the fuel cell stack 14 caused by executing an SR, in which there is a large amount of water supplied and only an endothermic reaction.

In the restart control according to the first example of the restart control flow of the solid oxide fuel cell device (SOFC) of the present embodiment, while at least a portion of the "Normal Startup ATR" in the normal startup ATR control band B3 of the "Restart Mode 1" is skipped through the active use of residual heat in the fuel cell stack 14 or reformer 20 at the time of startup, on the other hand because a "Restart SR" of the "Restart Mode 1" different from the "Normal Startup SR" of the "Normal Startup Mode 1" is executed, temperature drops in the reformer 20 associated with the supply of large amount of water can be restrained, and temperature can be much more appropriately recovered.

In the restart control according to the first example of the restart control flow of the solid oxide fuel cell device (SOFC) of the present embodiment, by executing a "Restart SR" of the "Restart Mode 1" in which the "Fuel Flow Amount" is larger than in the "Normal Startup SR" of the "Normal Startup Mode 1" in the restart mode SR control band B14a of the "Restart Mode 1" instead of the "Restart ATR" of the "Restart Mode 1" which is skipped, temperature drops in the reformer 20 and the fuel cell stack 14 can be restrained and a rapid temperature recovery achieved, even if the SR is an endothermic reaction only in a relatively low temperature band due to the execution of SR while maintaining a high combustion temperature due to the execution of a "Restart SR."

In addition, in the restart control according to a first example of the restart control flow of the solid oxide fuel cell device (SOFC) of the present embodiment, by executing a "Restart SR" of the "Restart Mode 1" in which the "Water Flow Amount" is smaller than in the "Normal Startup SR" of the "Normal Startup Mode 1," as an alternative when skipping the "Normal Startup ATR" of the "Normal Startup Mode 1," sudden falling into a bad spiraling state in which there is a sudden drop in reformer 20 temperature and a further drop in temperature caused by sudden endothermic reactions can be restrained, and a stable temperature rise can be speedily achieved.

Figure 12:
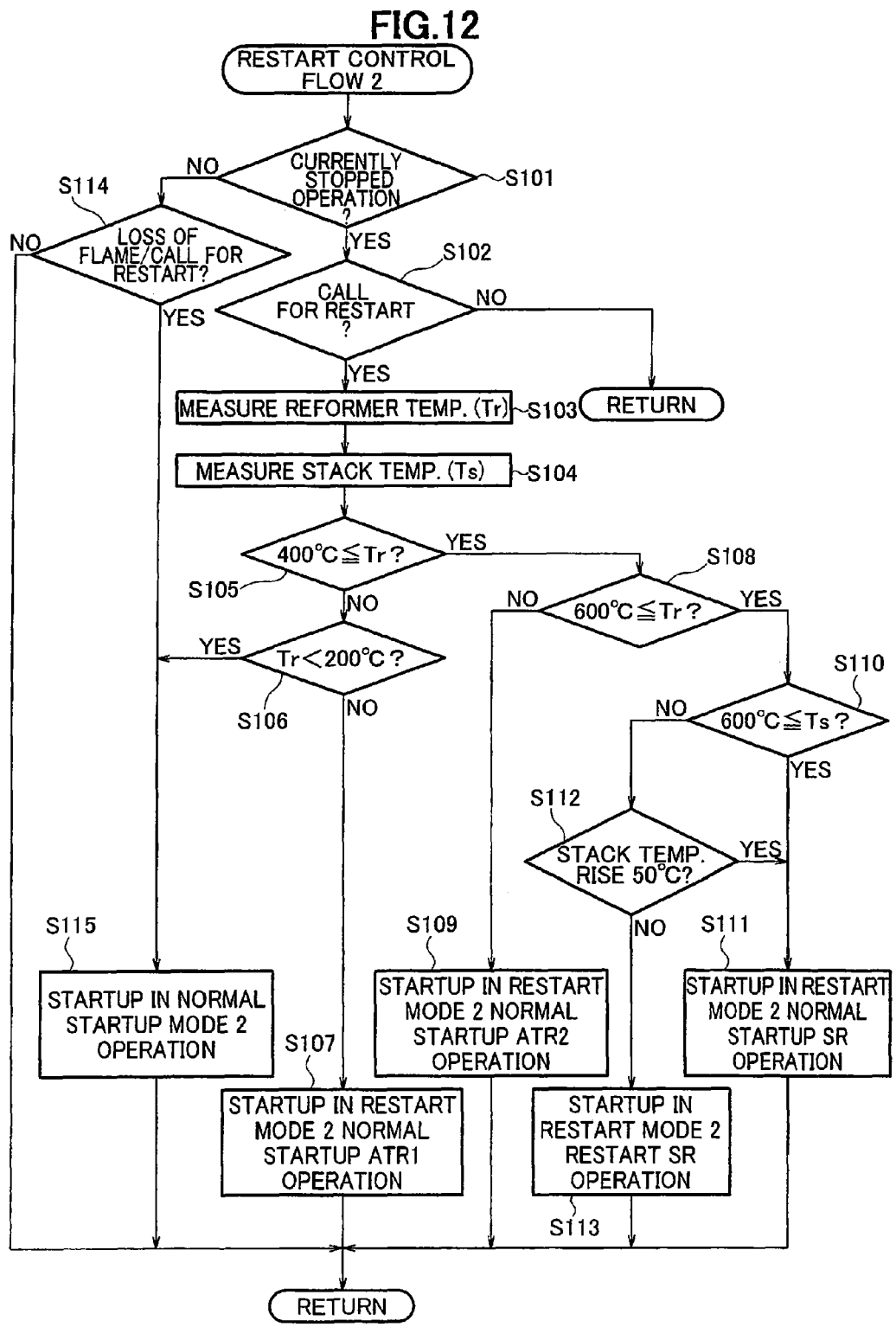
FIG. 12 is a flowchart showing a second example of restart control flow for restarting a solid oxide fuel cell device (SOFC) according to an embodiment of the present invention.

Next, referring to FIG. 12, specifics of the restart control flow in a solid oxide fuel cell device (SOFC) according to a second example of the present embodiment will be explained. FIG. 12 is a flowchart showing a second example of restart control flow (restart control flow 2) for restarting a solid oxide fuel cell device (SOFC) according to an embodiment of the present invention. In FIG. 12, an S denotes the various steps.

First, a determination is made in S101 as to whether the fuel cell module 2 operation is stopped; if stopped, the system advances to S102 and determines whether a restart is requested.

If it is determined in S102 that a restart is requested, the system advances to S103, and after measuring the reformer 20 temperature Tr(t) using the reformer temperature sensor 148, the system advances to S104 and the stack temperature Ts, which is the temperature in the vicinity of the fuel cell stack 14 (i.e., the individual fuel cells 84 themselves) is measured by generating chamber temperature sensor 142.

Next, advancing to S105, a determination is made as to whether the reformer temperature Tr is equal to or greater than 400° C.

If, in S105, it is determined that the reformer temperature Tr is not equal to or greater than 400° C., the system advances to S106 and determines if the reformer temperature Tr is less than 200° C.

If, in S106, it is determined that the reformer temperature Tr is not less than 200° C., i.e., that the reformer temperature Tr is equal to or greater than 200° C. and less than 400° C., the system advances to S107, and a "Normal Startup ATR1" is executed according to the "Restart Mode 2" in the data table shown in FIG. 9(B).

Also, if a determination is made in S105 that the reformer temperature Tr is equal to or greater than 400° C., the system advances to S108 and determines if the reformer temperature Tr is equal to or greater than 600° C.

If it is determined in S108 that the reformer temperature Tr is not equal to or greater than 600° C., i.e., that the reformer temperature Tr is equal to or greater than 400° C. and less than 600° C., the system advances to S109, and a "Normal Startup ATR 2" is executed according to the "Restart Mode 2" in the data table shown in FIG. 9(B).

On the other hand, if it is determined in S108 that the reformer temperature Tr is equal to or greater than 600° C., the system advances to S110 and determines whether the stack temperature Ts measured by the generating chamber temperature sensor 142 is equal to or greater than 600° C.

If, in S110, a determination is made that the stack temperature Ts is equal to or greater than 600° C., the system advances to S111, and a "Normal Startup SR" is executed according to the "Restart Mode 2" in the data table shown in FIG. 9(B).

On the other hand, if it is determined in S110 that the stack temperature Ts is not equal to or greater than 600° C., i.e., that the stack temperature Ts is less than 600° C. notwithstanding that the reformer temperature Tr is equal to or greater than 600° C., the system advances to S112, and a determination is made as to whether the stack temperature Ts has risen by 50° C. in a range of 500° C. or greater to less than 600° C.

If, in S112, a determination is made that the stack temperature Ts has risen by 50° C. in a range of 500° C. or greater to less than 600° C., the system advances to S111, and a "Normal Startup SR" is executed according to the "Restart Mode 2" in the data table shown in FIG. 9(B).

On the other hand, if a determination is made in S112 that the stack temperature Ts has not risen by 50° C. in a range of 500° C. or greater to less than 600° C., the system advances to S113, and a "Restart SR" is executed according to the "Restart Mode 2" in the data table shown in FIG. 9(B).

Next, a determination is made in S101 as to whether the fuel cell module 2 operation is stopped; if not stopped, the system advances to S114 and determines whether there is a request for a restart based on loss of flame during startup.

If, when there is a request for a restart based on loss of flame during startup, or there is a determination in S106 that the reformer temperature Tr is less than 200° C., the system advances to S115, and a restart is executed according to the "Normal Startup Mode 2" in the data table shown in FIG. 9(B).

Figure 13:
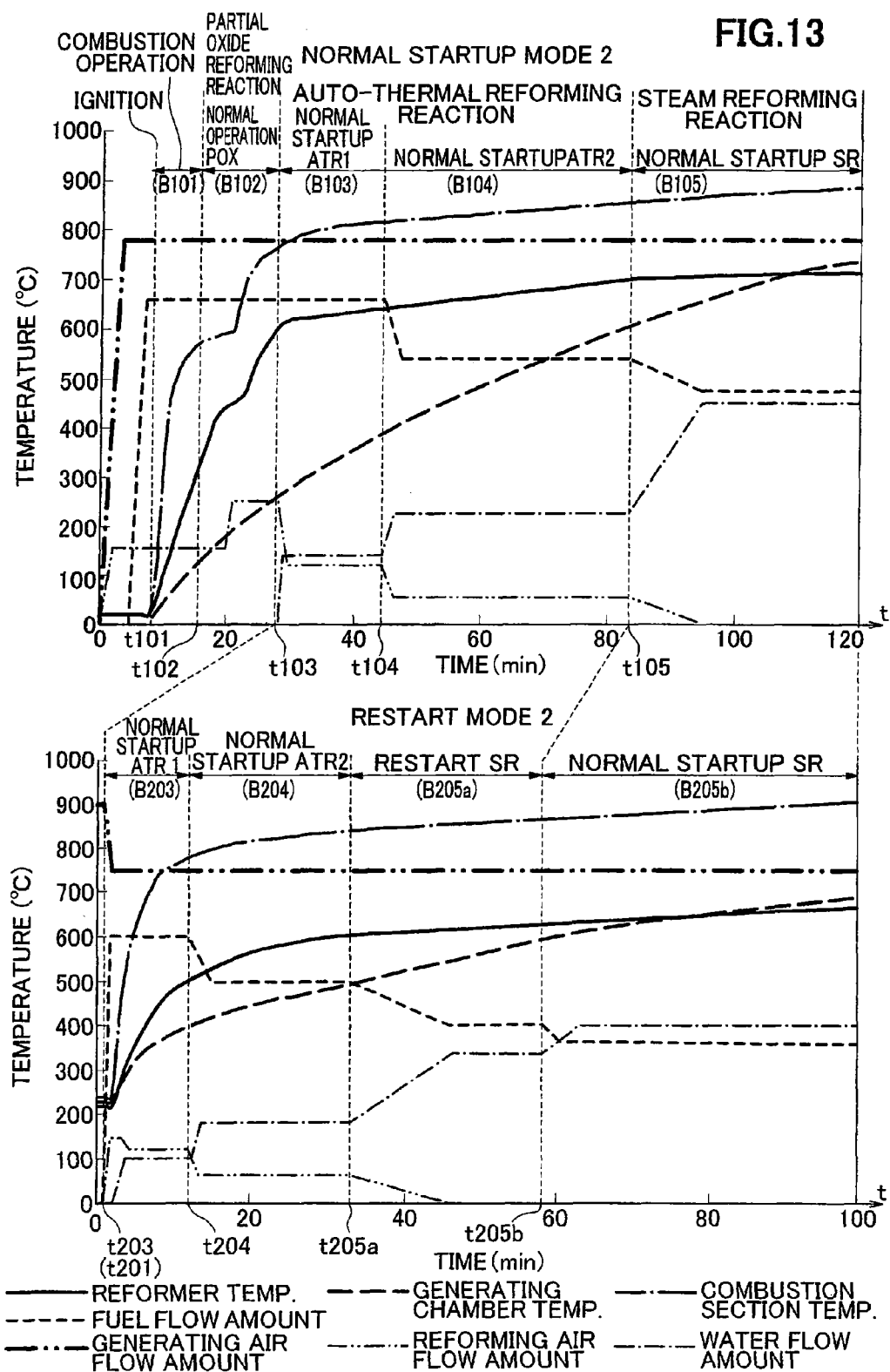
FIG. 13 is a diagram comparing a timing chart showing operations when restart is executed according to the second example restart control flow for the solid oxide fuel cell device (SOFC) according to the embodiment of the present invention shown in FIG. 12 to a timing chart showing normal startup operations.

Next, referring to FIG. 9(B), FIG. 12, and FIG. 13, the operation when a restart is executed based on a second example of the restart control flow of the solid oxide fuel cell device (SOFC) according to this embodiment as shown in FIG. 12 will be specifically explained.

Figure 14:
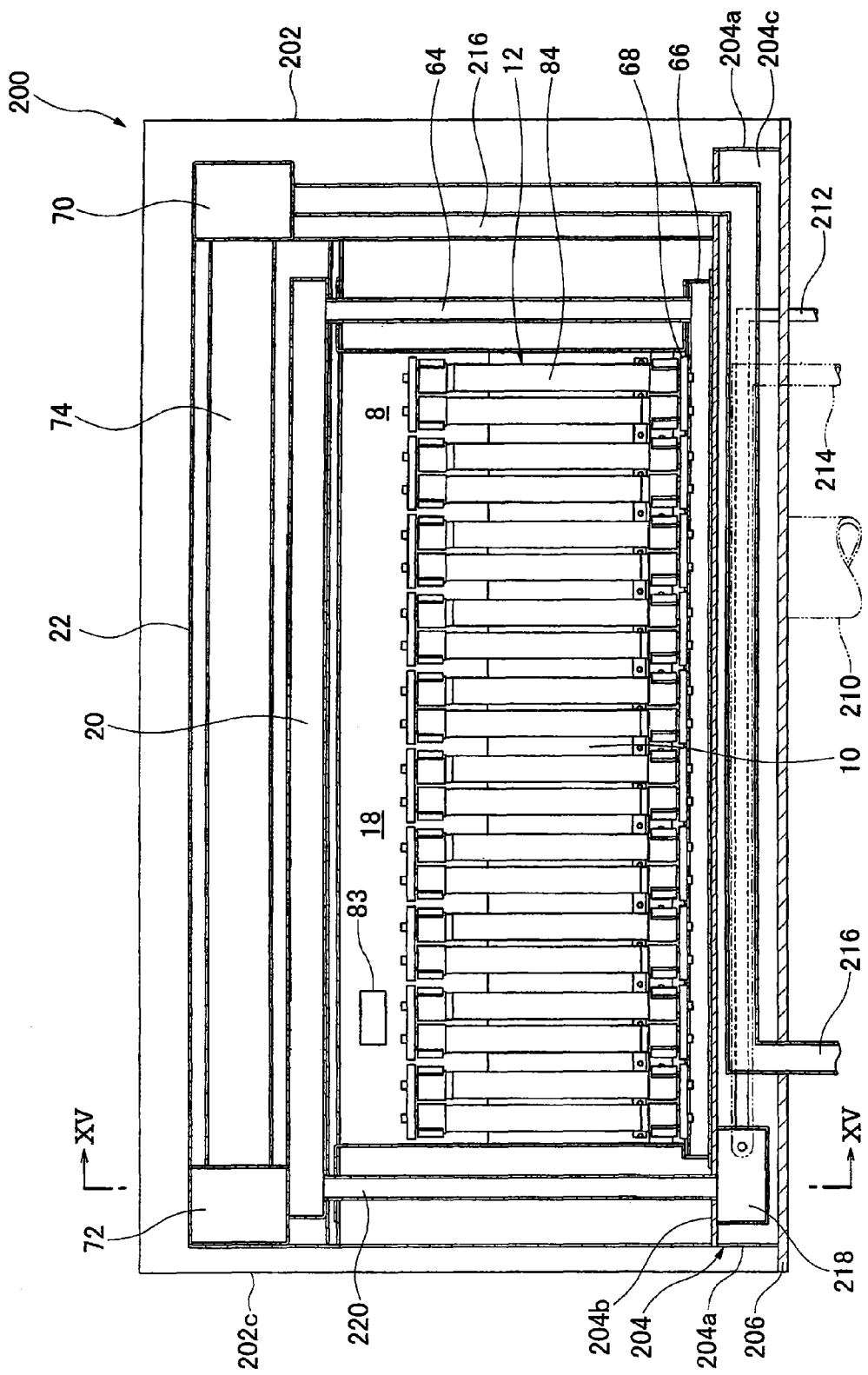
FIG. 14 is a front elevation view cross section showing a solid oxide fuel cell device (SOFC) fuel cell module according to another embodiment of the present invention.

FIG. 13 is a figure comparing a timing chart showing operation when restart is executed based on a second example of the restart control flow in a solid oxide fuel cell device (SOFC) according to the embodiment of the present invention shown in FIG. 14 to a timing chart showing normal startup operations.

Note that the timing chart in the upper portion of FIG. 13 shows the normal startup operation of a solid oxide fuel cell device (SOFC) when the "Normal Startup Mode 2" in the data table shown in FIG. 9(B) is executed, and the timing chart in the bottom portion of FIG. 13 shows the restart operation of a solid oxide fuel cell device (SOFC) when the "Restart Mode 2" in the data table shown in FIG. 9(B) is executed.

For an explanation of the restart operation based on the second example of restart control flow (restart flow 2) of the solid oxide fuel cell device (SOFC) of the present embodiment, referring only to the data table regarding the "Normal Startup Mode 2" and "Restart Mode 2" shown in FIG. 9(B), the restart operation under "Restart Mode 2" of the solid oxide fuel cell device (SOFC) of the present embodiment shown in FIG. 13 is explained by comparing it with the operation in normal startup according to the "Normal Startup Mode 2."

First, as shown in FIG. 9(B), restart control according to "Normal Startup Mode 2" is executed starting from "Time of Ignition" in the sequence "Combustion Operation," "Normal Startup PDX," "Normal Startup ATR 1," "Normal Startup ATR 2," and "Normal Startup SR." Here, with respect to the times t on the horizontal axis of the "Normal Startup Mode 2" timing chart in FIG. 13, the time of the "Time of Ignition" is referred to as t101, and the times at which the transitions occur in the sequence "Combustion Operation," "Normal Startup PDX," "Normal Startup ATR 1," "Normal Startup ATR 2," and "Normal Startup SR" are referred to respectively as t102, t103, t104, and t105.

The operating state shown in FIG. 9(B) referred to as "Time of Ignition" of the "Normal Startup Mode 2" is the state which turns on the ignition device 83, ignites the fuel gas, and starts combustion; if this temperature of the reformer 20 detected by the reformer temperature sensor 148 at the time of ignition (t=t101) is deemed "temperature at time of ignition Tr(t101)," then this temperature at time of ignition Tr(t101) is lower than the temperature of the reformer 20 at the start of PDX (t=t102)) (the "PDX Starting Temperature Tr(t102)" below) (=300° C.).

Next, the "Combustion Operation" operating state of the "Normal Startup Mode 2" is one in which, after starting combustion following ignition of the fuel gas, startup is controlled in a control band (the "Combustion Operation Control Band B101" below) for executing a combustion operation to heat the reformer 20 through combustion of this fuel gas; this is executed in a temperature band W101 in which the temperature of the reformer 20 detected by the reformer temperature sensor 148 is between the temperature at the time of ignition Tr(t101) up to a temperature below the PDX starting temperature Tr(t102) (=300° C.).

Next, the operating state referred to as the "Normal Startup PDX" of the "Normal Startup Mode 2" is one in which, when in a temperature band (the "Normal Startup PDX temperature band W102 (300° C.≤Tr(t)<600° C.) in which the temperature Tr(t) of the reformer 20 detected by the reformer temperature sensor 148 is equal to or greater than the PDX starting temperature Tr(t102) (=300° C.) and less than the temperature at which SR is possible (the "SR Feasible Temperature Tr(t103)" below) (=600° C.) (i.e., 300° C.≤Tr(t)<600° C.), startup is controlled in a control band (the "Normal Startup Mode PDX Control Band B102" below) in which PDX is executed by heating the reformer 20 using the reaction heat from PDX and the combustion heat of the fuel gas.

Next, the operating state referred to as the "Normal Startup ATR 1" of the "Normal Startup Mode 2," is one in which, when the temperature Tr(t) of the reformer 20 detected by the reformer temperature sensor 148 is in a temperature band starting at the temperature at which SR is possible Tr(t103) (=600° C.), and the stack temperature Ts measured by the generating chamber temperature sensor 142 is in a temperature band equal to or greater than 250° C. and less than 400° C. (250° C.≤Ts<400° C.) (the "Normal Startup ATR1 Temperature Band W103" below), the reaction heat from PDX, the combustion heat of fuel gas, and the absorption of heat by SR are controlled to heat the reformer 20, and startup is controlled in the control band for executing ATR (the "Normal Startup Mode ATR1 Control Band B103" below).

Next, the operating state referred to as the "Normal Startup ATR2" of the "Normal Startup Mode 2," is one in which, when the temperature Tr(t) of the reformer 20 detected by the reformer temperature sensor 148 is equal to or greater than the temperature at which SR is possible Tr(t103) (=600° C.), and the stack temperature Ts measured by the generating chamber temperature sensor 142 is in a temperature band equal to or greater than 400° C. and less than 600° C. (400° C.≤Ts <600° C.), the reaction heat from PDX, the combustion heat of fuel gas, and the absorption of heat by SR are controlled to heat the reformer 20, and startup is controlled in the control band for executing an ATR (the "Normal Startup Mode ATR2 control band B104" below) different from the "Normal Startup ATR1" of the "Normal Startup Mode 2."

Here, with respect to the points of difference between the "Normal Startup ATR1" and "Normal Startup ATR2" of the "Normal Startup Mode 2," the transition temperature conditions for their stack temperatures Ts differ as explained above, and in addition to the point that the normal startup ATR1 temperature band W103 is on the low temperature side of the normal startup ATR2 temperature band W104, a characteristic difference is that the "Fuel Flow Amount" and "Reforming Air Flow Amount" of the "Normal Startup ATR1" are set higher than the "Fuel Flow Amount" and "Reforming Air Flow Amount" of the "Normal Startup ATR2," whereas the "Water Flow Amount" of the "Normal Startup ATR1" is set to be lower than the "Water Flow Amount" of the "Normal Startup ATR2".

Next, the operating state referred to as "Normal Startup SR" of the "Normal Startup Mode 2" is one in which, when the temperature Tr(t) of the reformer 20 detected by the reformer temperature sensor 148 is at a predetermined steady state temperature Tr(t105), and the stack temperature Ts measured by the generating chamber temperature sensor 142 is equal to or greater than 600° C., startup is controlled in the control band (the "Normal Startup Mode SR Control Band B105" below) in which SR is executed.

Figure 15:
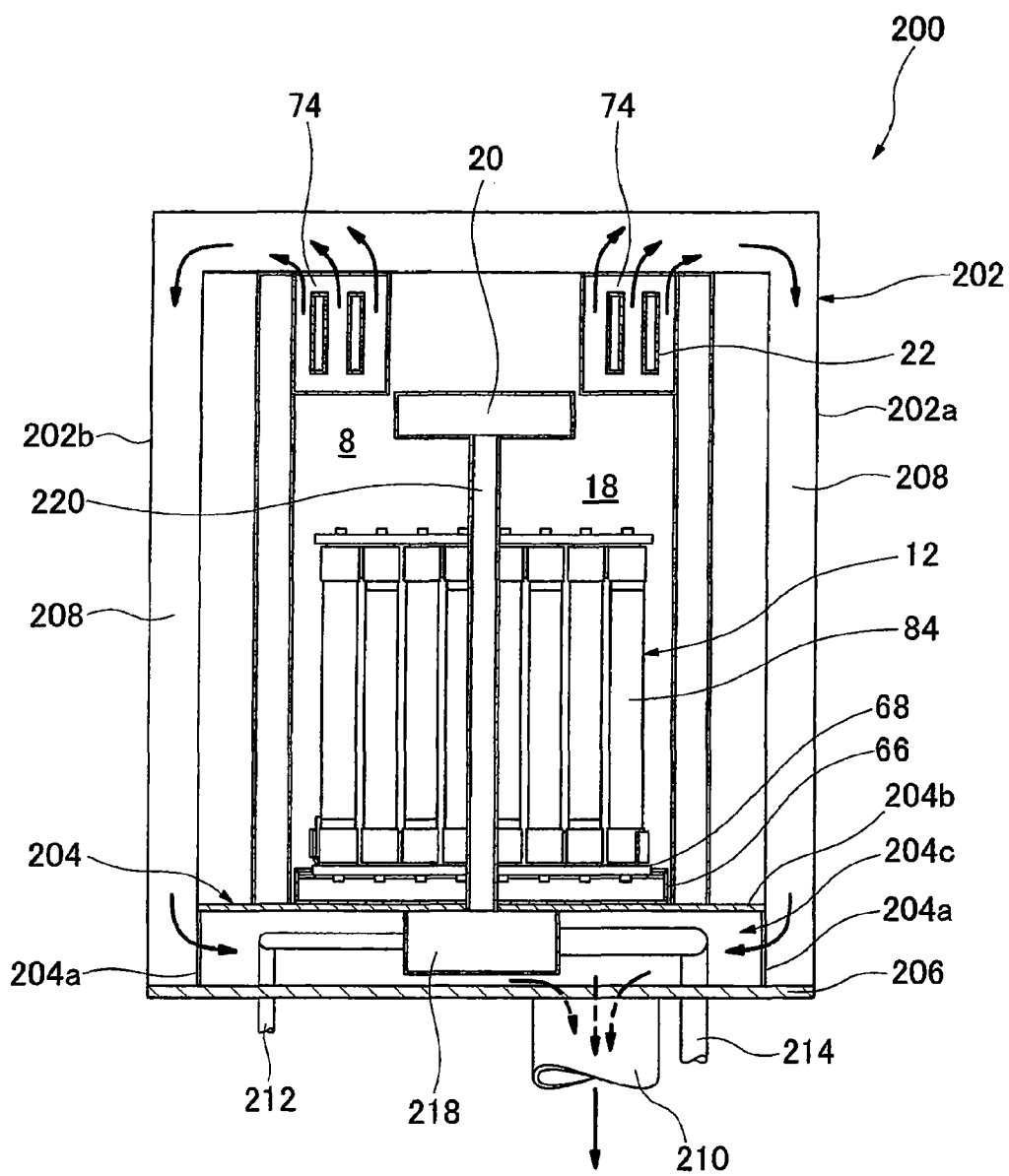
FIG. 15 is a sectional view along line XV-XV in FIG. 14.

Next, as shown in FIG. 9(B), restart control according to "Restart Mode 2" is executed starting from "Time of Ignition" in the sequence "Normal Startup ATR1," "Normal Startup ATR2," "Restart SR," and "Normal Startup SR." Here, with respect to the times t on the horizontal axis of the "Restart Mode 2" timing chart in FIG. 15, the time of the "Time of Ignition" is referred to as t201, and the times at which the transitions occur in the sequence "Normal Startup ATR 1," "Normal Startup ATR 2," "Restart SR" and "Normal Startup SR" are referred to respectively as t203, t204, and t205a, and t205b.

The operating state shown in FIG. 9(B) and referred to as "Time of Ignition" under "Restart Mode 2" is one in which, when a restart is requested while the fuel cell module 2 operation is stopped, a normal startup based on the "Normal Startup Mode 2" is executed starting with the "Combustion Operation" following ignition in the "Normal Startup Mode 2" (See FIG. 12, S106 and S115) when the temperature Tr(t) of the reformer 20 detected by the reformer temperature sensor 148 is less than a predetermined temperature Tr(t201) (=200° C.), which is below the above-described PDX starting temperature Tr(t102) (=300° C.) in the normal startup mode PDX control band B102 of the "Normal Startup Mode 2".

On the other hand, when the reformer 20 temperature Tr(t201) is equal to or greater than a predetermined temperature (=200° C.), there is a transition to the "Normal Startup ATR1" operating state of the "Restart Mode 2" (see FIG. 12, S107) immediately after the ignition device 83 turns on and the fuel gas is ignited.

In this "Normal Startup ATR1" executed in the restart mode ATR control band B203 "Restart Mode 2", only the temperature band of the reformer temperature Tr and stack temperature Ts differ from the "Normal Startup ATR1" executed in the normal startup mode ATR control band B103 of the "Normal Startup Mode 2"; the "Fuel Flow Amount," "Reforming Air Flow Amount," "Generating Air Flow Amount," and "Water Flow Amount" are the same.

More specifically, while it is true that the temperature band of the reformer temperature Tr and stack temperature Ts (the "Normal Startup ATR Temperature Band W203" below) in which the "Normal Startup ATR1" is executed in the restart mode ATR control band B203 of the "Restart Mode 2" is a temperature band (200° C.≤Tr<400° C., Ts<400° C.) partially overlapping the normal startup PDX temperature band W2 (300° C.≤Tr(t)<600° C.; Ts<250° C.) in which a "Normal Startup PDX" is executed in the normal startup mode PDX control band B102 in the "Normal Startup Mode 1," on the other hand, only the stack temperature Ts overlaps in part with the normal startup ATR temperature band W103 (600° C.≤Tr(t)<650° C.; 250°≤Ts<600° C.) in which the "Normal Startup ATR1" is executed in the normal startup mode ATR control band B103 of the "Normal Startup Mode 2".

Next, the operating state referred to as "Restart ATR1" of the "Restart Mode 2" in FIG. 9(B) and S107 in FIG. 12 controls restart in a control band (the "Restart Mode ATR1 control band B203" below) for executing an ATR different from the "Normal Startup ATR1" in the "Normal Startup Mode 2."

More specifically, while it is true that the temperature band of the reformer temperature Tr and stack temperature Ts (the "Normal Startup ATR Temperature Band W203" below) in which the "Normal Startup ATR1" is executed in the restart mode ATR control band B203 of the "Restart Mode 2" is a temperature band (200° C.≤Tr<400° C., Ts<400° C.) partially overlapping the normal startup PDX temperature band W102 (300° C.≤Tr(t)<600° C.; Ts<250° C.) in which a "Normal Startup PDX" is executed in the normal startup mode PDX control band B102 in the "Normal Startup Mode 2," it is a temperature band in which only the stack temperature Ts overlaps in part with the normal startup ATR temperature band W103 (600° C.≤Tr(t)<650° C.; 250°≤Ts<400° C.) in which the "Normal Startup ATR1" is executed in the normal startup mode ATR control band B103 of the "Normal Startup Mode 2". Next, the operating state referred to as "Normal Setup ATR2" of the "Restart Mode 2" in FIG. 9(B) and S109 in FIG. 12 controls restart in a control band (the "Restart Mode ATR control band B204" below) for executing an ATR different from the "Normal Startup ATR2" in the "Normal Startup Mode 2" and the "Normal Startup ATR1" in the "Restart Mode 2."

More specifically, the temperature band of the reformer temperature Tr and stack temperature Ts (400° C.≤Tr(t)<600° C.; 400° C.≤Ts<500° C.) (the "Normal Startup ATR Temperature Band W204" below) in which the "Normal Startup ATR2" is executed in the restart mode ATR control band B204 of the "Restart Mode 2" is a temperature band in which only the stack temperature Ts partially overlaps the normal startup ATR2 temperature band W104 (600° C.≤Tr(t)<650° C.; 400° C.≤Ts<600° C.) in which the "Normal Startup ATR2" is executed in the normal startup mode ATR2 control band B104 of the "Normal Startup Mode 2".

Next, the operating state referred to as "Restart SR" of the "Restart Mode 2" shown in FIG. 9(B) and S113 in FIG. 12, controls restart in the control band (the "Restart Mode SR Control Band B205a" below) for executing an SR different from the "Normal Startup SR" in the "Normal Startup Mode 2."

More specifically, the temperature band of the reformer temperature Tr and stack temperature Ts (600° C.≤Tr(t)<650° C.; 500° C.≤Ts<600° C.) (the "Restart SR temperature band W205a" below) in which the "Restart SR" is executed in the restart mode SR control band B205a of the "Restart Mode 2" is a temperature band which partially overlaps the normal startup ATR temperature band W104 (600° C.≤Tr(t)<650° C.; 400° C.≤Ts<600° C.) in which the "Normal Startup ATR2" is executed in the normal startup mode ATR2 control band B 104 of the "Normal Startup Mode 2".

However, in the restart mode SR control band B205a of the "Restart Mode 2", the "Normal Startup ATR2" of the "Normal Startup Mode 2" is not executed even though, in particular, there is a portion of the restart ATR temperature band W205a (600° C.≤Tr(t)<650° C.; 500° C.≤Ts<600° C.) in which the "Restart SR" of the "Restart Mode 2" is executed which overlaps the normal startup ATR2 temperature band W104 (600° C.≤Tr(t)<650° C.; 250° C.≤Ts<600° C.) in which the "Normal Startup ATR2" of the "Normal Startup Mode 2" is executed.

In the restart mode SR control band B205a of the "Restart Mode 2", there is a transition to execution of the "Normal Startup SR" under "Restart Mode 2" at the point when the stack temperature Ts has risen by 50° C. within a range of 500° C. or greater to less than 600° C. (see FIG. 12, S112 and S111).

In addition, as shown in FIG. 9(B), the "Fuel Flow Amount" in the "Restart SR" operating state of the "Restart Mode 2" is 3.5 L/min, which is less than the "Fuel Flow Amount" in the "Normal Startup ATR2" operating state of the "Normal Startup Mode 2" (4.0 L/min) and more than the "Fuel Flow Amount" in the "Normal Startup SR" operating state of the "Normal Startup Mode 2" (3.0 L/min).

In addition, as shown in FIG. 9(B), the "Water Flow Amount" in the "Restart SR" operating state of the "Restart Mode 2" is 6.0 cc/min, which is more than the "Water Flow Amount" in the "Normal Startup ATR2" operating state of the "Normal Startup Mode 2" (3.0 cc/min) and less than the "Water Flow Amount" in the "Normal Startup SR" operating state of the "Normal Startup Mode 2" (8.0 cc/min).

Next, the "Normal Startup SR" operating state of the "Restart Mode 2" shown in FIG. 9(B) and S111 of FIG. 12 is one in which the temperature band of the reformer temperature Tr and stack temperature Ts (the "Normal Startup SR temperature band W205b" below) is the same as the normal startup SR temperature band W105 of the "Normal Startup Mode 2" (650° C.≤Tr(t), 600≤Ts), whereby restart is controlled in a control band (the "Restart Mode SR Control Band B205b" below) for executing an SR which is the same as the "Normal Startup SR" of the "Normal Startup Mode 2."

In the restart mode SR control band B205a in which the restart SR of the "Restart Mode 2" is executed, if it is focused on the "Restart SR" after the rise in temperature, up until the execution of the "Normal Startup SR" in the restart mode SR control band B205 of the "Restart Mode 2" after the transition to "Normal Startup SR" following the rise by 50° C. of the stack temperature Ts in a range from 500° or greater to less than 600° C., with respect to the execution from "Restart SR" to "Normal Startup SR" following the temperature rise in the "Restart Mode 2", a predetermined "Fuel Flow Amount" and "Water Flow Amount" in the "Normal Startup SR" of the "Normal Startup Mode 2" are maintained at a fixed level and "Normal Startup SR" is executed in the normal startup mode SR control band B205 in which the "Normal Startup SR" of the "Normal Startup Mode 2" is executed.

Furthermore, the time t205a over which the transition from the "Normal Startup ATR2" of the "Restart Mode 2" to the "Restart SR" occurs is also shorter than the time t105 over which the transition from the "Normal Startup ATR2" of the "Normal Startup Mode 2" to the "Normal Startup SR" occurs, and the startup time for restart is shorter compared to the startup time for normal startup.

In the restart control according to the second example restart control flow of the solid oxide fuel cell device (SOFC) of the above-described present embodiment, a "Restart SR" of the "Restart Mode 2" in which the "Fuel Flow Amount" is more and the "Water Flow Amount" is less than in the "Normal Startup SR" of the "Normal Startup Mode 2" is executed in the restart mode SR control band B205a of the "Restart Mode 2", the transition to "Normal Startup SR" occurs when the stack temperature Ts rises by 50° C. in a range from 500° C. or greater to less than 600° C., and because SR is actively executed, a stable temperature rise can be achieved while restraining sudden drops in the reformer 20 temperature.

Also, in the restart control according to the second example restart control flow of the solid oxide fuel cell device (SOFC) of the present embodiment, with respect to the execution from "Restart SR" to "Normal Startup SR" after the rise in temperature in the "Restart Mode 2," the "Normal Startup SR" is executed by maintaining the "Fuel Flow Amount" and "Water Flow Amount" in the "Normal Startup SR" of the "Normal Startup Mode 2" at a fixed level predetermined in the normal startup mode SR control band B205 in which the "Normal Startup SR" of the "Normal Startup Mode 2" is executed, therefore even in a low temperature, unstable temperature band for SR operation, factors which cause the reforming state to change are prevented, therefore the transition is stable from "Restart SR" to "Normal Startup SR" after the rise in temperature in the "Restart Mode 2," and the recovery of temperature in the reformer 20 and the fuel cell stack 14 can be quickly and stably accomplished.

Next, a solid oxide fuel cell device (SOFC) according to another embodiment of the present invention will be explained.

Figure 16:
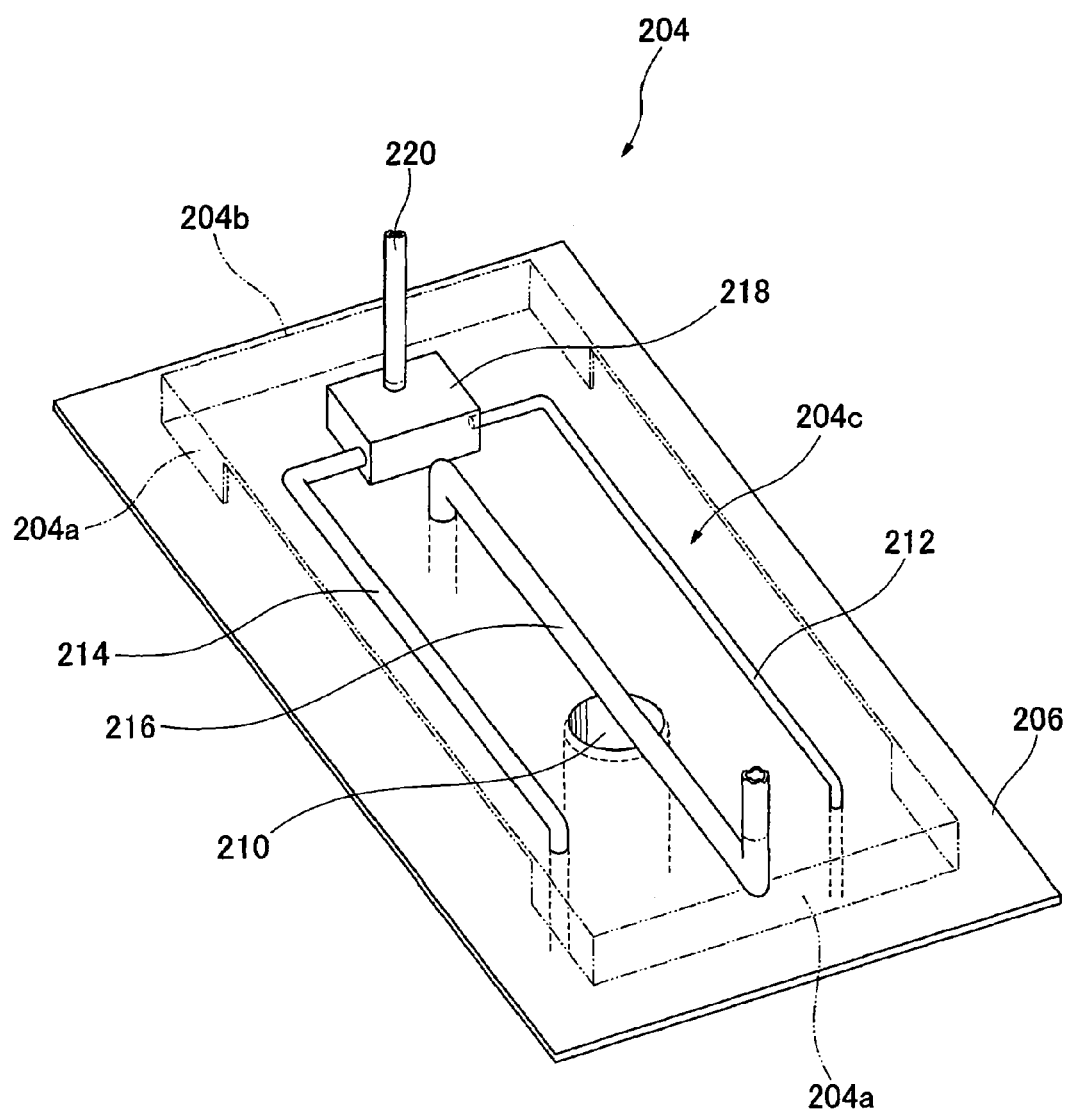
FIG. 16 is a perspective view of a cell assembly support unit of a fuel cell module of a solid oxide fuel cell device (SOFC) seen diagonally from above according to another embodiment of the present invention.

FIG. 14 is a front elevation cross section showing a solid oxide fuel cell device (SOFC) fuel cell module according to another embodiment of the present invention; FIG. 15 is a sectional diagram along line XV-XV in FIG. 14; FIG. 16 is a perspective view seen diagonally from above of the manifold portion in a fuel cell module of a solid oxide fuel cell device (SOFC) according to another embodiment of the present invention.

In FIGS. 14-16, the same reference numerals are used for the same parts of the solid oxide fuel cell device (SOFC) according to the above-described embodiment of the present invention, an explanation of those is here omitted.

As shown in FIGS. 14-16, a cell assembly support unit 204 for supporting the bottom portion of the fuel cell assembly 12 disposed at the bottom of the reformer 20 is provided inside the housing 202 of the fuel cell module 200.

This cell assembly support unit 204 is furnished with a support member 204a and a partitioning plate 204b.

The support members 204a are affixed to a base member 206 serving as the base portion of the fuel cell module 200, and support the two edge portions in the longitudinal direction of the partitioning plate 204b (the left edge portion and right edge portion of the partitioning plate 204b in FIG. 14) by placement at a predetermined spacing pointing upward from the base member 206.

The cell assembly support unit 204 forms an exhaust gas chamber 204c in the space with the base member 206.

Furthermore, as shown in FIG. 15, an exhaust gas conduit 208 extending upward and downward is formed on the inside of the front surface 202a and rear surface 202b, which are surfaces along the longitudinal direction of the housing 202; the bottom end of this exhaust gas conduit 208 connects with the exhaust gas chamber 204c.

An exhaust gas exhaust pipe 210 is connected to the bottom surface of the exhaust gas chamber 204c; the downstream end of this exhaust gas exhaust pipe 210 is connected to the above-described hot water production device 50, which is shown in FIG. 1.

In addition, disposed within the exhaust gas chamber 204c are a pure water intake pipe 212 for introducing pure water into the reformer 20, a reforming gas intake pipe 214 for introducing fuel gas to be reformed and reforming air, an air intake pipe 216 for introducing air residually heated by the electrical generating chamber 10, and a mixing chamber 218 to which the respective downstream ends of this pure water intake pipe 212 and reformed gas intake pipe 214 are connected.

In the mixing chamber 218, steam (pure water) supplied from the pure water intake pipe 212 is mixed with fuel gas to be reformed and reforming air supplied from the reforming gas intake pipe 214.

With respect to this pure water intake pipe 212 and reforming gas intake pipe 214, they are connected to the mixing chamber 218 by extending in the horizontal direction within the exhaust gas chamber 204c after extending upward to within the exhaust gas chamber 204c from the bottom side of the base member 206 on the fuel cell module 200; by running the pure water intake pipe 212 and the reforming gas intake pipe 214 through the exhaust gas chamber 204c, heat from the exhaust gas in the exhaust gas chamber 204c can be utilized, and the steam (pure water) or reforming air can be kept hot prior to being supplied to the reformer 20, thereby restraining drops in temperature.

A pipe 220 is connected so as to extend vertically between the mixing chamber 218 and the upstream side of the reformer 20; fuel gas and air into which steam (pure water) was mixed in the mixing chamber 218 is fed into the reformer 20 through the pipe 220 and reformed by means of the reforming catalyst which the reformer 20 is filled.

Furthermore, the pipe 220 is disposed adjacent to a side surface 202c (the left side surface of the housing 202 in FIG. 14), different from the opposing front surface 202a and rear surface 202b pair on the housing 202 which form the exhaust gas conduit 208; by keeping the steam (pure water) in the pipe 220 hot, drops in the temperature of the steam (pure water) and reforming air prior to supply to the reformer 20 can be restrained.

A fuel gas supply pipe 64 is connected to the downstream end of the reformer 20; this fuel gas supply pipe 64 extends downward, and further extends horizontally into a manifold 66 formed at the bottom of the fuel cell assembly 12. Multiple fuel supply holes 64b are formed on the bottom surface of a horizontal portion 64a of the fuel gas supply line 64; reformed fuel gas is supplied into the manifold 66 from these fuel supply holes 64b.

In the solid oxide fuel cell according to another embodiment of the present invention described above, because the temperature of the steam (pure water) supplied to the reformer 20 through the pipe 220 from the pure water intake pipe 212 during restart is maintained at a high level by utilizing the heat of the exhaust gas in the exhaust gas chamber 204c, temperature drops in the individual fuel cells 84 or the reformer 20 associated with the supply of steam (pure water) in ATR at the time of restart can be restrained.

Also, in the solid oxide fuel cell according to another embodiment of the present invention described above, because heat exchange from the housing 202 can be accomplished with water only on other side surface 202c due to the separation of the pipe 220 from the exhaust gas conduit 208 with respect to the housing 202, the temperature of the water supplied from the pipe 220 to the reformer 20 upon startup can be maintained at a high level.

EXPLANATION OF REFERENCE NUMERALS

1: solid oxide fuel cell device (SOFC)
2: fuel cell module
4: auxiliary unit
8: sealed space
10: electrical generating chamber
12: fuel cell assembly
14: fuel cell stack
16: fuel cell unit
18: combustion chamber
20: reformer
22: heat exchanger for air
24: water supply source
26: pure water tank
28: water flow regulator unit
30: fuel supply source
38: fuel flow regulator unit
40: air supply source
44: reforming air flow regulator unit
45: generating air flow regulator unit
46: first heater
48: second heater
50: hot water production device
52: control box
54: inverter
83: ignition device
84: fuel cells
110: control section
112: operating device
114: display device
116: warning device
126: electrical power state detecting sensor
142: Generating chamber temperature sensor
150: outside air temperature sensor

What is claimed is:

1. A solid oxide fuel cell system for generating electricity by causing an electro-chemical reaction of a fuel gas and an oxidation gas, comprising:
   solid oxide fuel cells disposed within a solid oxide fuel cell module which is thermally prepared for generation of electricity through a series of startup operations comprising an auto-thermal reforming reaction (ATR) operation, and a steam reforming reaction (SR) operation;
   a reformer that reforms fuel gas and supplies the fuel gas to the fuel cells;
   a temperature detector that detects a reforming state temperature in order to change a state of reforming reaction which occurs in the reformer; and
   a controller programed to control the operations of the fuel cell module, the controller comprising a startup control device programed to control the startup operations of the fuel cell module, and a stop control device programed to control a stop operation of the fuel cell module,
   wherein the startup control device is programed to execute a combustion operation to rise a temperature of the reformer with heat of the combusting fuel gas when, after the fuel gas is ignited and caused to combust, the reforming state temperature detected by the temperature detector is lower than an ATR starting temperature at which the ATR operation is able to start,
   the startup control device is further programed to execute the ATR operation to raise the temperature of the reformer when the reforming state temperature is equal to or greater than a temperature at which a steam reforming reaction is able to occur and falls within an ATR temperature range below a predetermined steady state temperature,
   the startup control device is further programed to execute the SR operation to raise the temperature of the reformer when the reforming state temperature is equal to or greater than the predetermined steady state temperature, and wherein the startup control device is further programmed to restart the startup operations directly from the SR operation without performing the ATR operation when the reforming state temperature falls in a high temperature region within the ATR temperature range, in response to a restart request if received when the reforming state temperature is within the ATR temperature range while the stop control device is performing the stop operation to thereby cause the fuel cell module to be cooling down from a high temperature.

2. The solid oxide fuel cell system according to claim 1, wherein the startup control device is programed to restart the startup operations from the ATR operation when the reforming state temperature is less than a predetermined temperature within the ATR temperature range, and restart the startup operations from the SR operation when the reforming state temperature is equal to or greater than the predetermined temperature within the ATR temperature range.

3. The solid oxide fuel cell system according to claim 1 wherein the startup control device is programed to restart the startup operations, when the reforming state temperature falls within the high temperature region of the ATR temperature range, from a modified SR operation which differs from the SR operation, instead of performing the ATR and SR operations.

4. The solid oxide fuel cell system according to claim 2 wherein the startup control device is programed to restart the startup operations, when the reforming state temperature falls within the high temperature region of the ATR temperature range, from a modified SR operation which differs from the SR operation, instead of performing the ATR and SR operations.

5. The solid oxide fuel cell system according to claim 3, wherein the startup control device is programed to supply more fuel gas when restarting the startup operations from the SR operation than normally supplied for the SR operation.

6. The solid oxide fuel cell system according to claim 3, wherein the startup control device is programed to supply less water when restarting the startup operations from the SR operation than normally supplied for the SR operation.

7. The solid oxide fuel cell system according to claim 3, wherein the SR operation performed in a restart changes to a normal startup SR when the reforming state temperature rises to or above a predetermined temperature.

8. The solid oxide fuel cell system according to claim 3, wherein the startup control device is programed to restart the startup operations from the SR operation, while maintaining fuel gas supply and water supply at predetermined constant rates without variation.

9. The solid oxide fuel cell system according to claim 1, further comprising a water supply device for producing pure water and supplying the pure water to the reformer, wherein the water supply device has a water pipe for introducing water to the reformer and a warming device for keeping the water pipe warm.

10. The solid oxide fuel cell system according to claim 9, further comprising a cell assembly support device for supporting a lower portion of a cell assembly having a plurality of individual fuel cells, and for forming an exhaust gas chamber into which exhaust gas produced by combustion of the fuel gas and the oxidation gas is discharged, and the warming device restrains temperature drops in the water supplied to the reformer by disposing the water pipe so that the water pipe passes through the exhaust gas chamber.

11. The solid oxide fuel cell system according to claim 9, further comprising a housing member for containing the cell assembly, and an exhaust gas conduit for communicating with the exhaust gas chamber is disposed on the pair of opposing sides forming the housing member, and the water pipe conduit is disposed on the other side thereof.

* * * * *